US006625602B1

United States Patent
Meredith et al.

(10) Patent No.: US 6,625,602 B1
(45) Date of Patent: Sep. 23, 2003

(54) METHOD AND SYSTEM FOR HIERARCHICAL TRANSACTIONS AND COMPENSATION

(75) Inventors: Lucius Gregory Meredith, Seattle, WA (US); Amit Mital, Kirkland, WA (US); Marc Levy, Woodinville, WA (US); Brian Beckman, Newcastle, WA (US); Anthony Andrews, Redmond, WA (US); Bimal Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,225

(22) Filed: Apr. 28, 2000

(51) Int. Cl.[7] .................................................. G06F 7/00
(52) U.S. Cl. ................. 707/8; 707/9; 707/202
(58) Field of Search ................. 707/1, 2, 8, 9, 707/200, 201, 202

(56) References Cited

U.S. PATENT DOCUMENTS

| 5,261,069 | A | 11/1993 | Wilkinson et al. ............ 707/8 |
| 5,524,241 | A | 6/1996 | Ghoneimy et al. ........... 707/10 |
| 5,581,691 | A | 12/1996 | Hsu et al. ...................... 714/15 |
| 5,630,069 | A | 5/1997 | Flores et al. .................... 705/7 |
| 5,706,429 | A | 1/1998 | Lai et al. ...................... 709/230 |
| 5,870,545 | A | * | 2/1999 | Davis et al. ................. 707/202 |
| 5,878,206 | A | * | 3/1999 | Chen et al. .................. 709/201 |
| 5,918,218 | A | | 6/1999 | Harris et al. .................. 705/35 |
| 5,940,839 | A | | 8/1999 | Chen et al. ..................... 707/10 |
| 5,960,420 | A | | 9/1999 | Leymann et al. ............... 705/8 |
| 6,009,405 | A | | 12/1999 | Leymann et al. ............... 705/1 |
| 6,012,094 | A | * | 1/2000 | Leymann et al. ............. 707/10 |

* cited by examiner

Primary Examiner—Diane Mizrahi
Assistant Examiner—Michael Spiegel
(74) Attorney, Agent, or Firm—Amin & Turocy, LLP

(57) ABSTRACT

A method for executing a schedule in a workflow application is provided. The method comprises a hierarchical transaction commit rule allowing access to the data associated with an action in the schedule according to a transaction boundary and the state of the action. The invention further comprises selectively compensating at least one action according to a compensation parameter and at least one transaction boundary after abortion of another action. The invention further provides storing schedule state information to a storage medium based on a transaction boundary within the schedule. In addition, the invention provides for selectively obtaining at least a portion of the schedule state information from the storage medium, and selectively monitoring the schedule execution based on at least a portion of the schedule information obtained from the storage medium. Further provided, is a computer-readable medium having computer-executable instructions for performing the steps of the above methods.

32 Claims, 17 Drawing Sheets

METHOD AND SYSTEM FOR HIERARCHICAL TRANSACTIONS AND COMPENSATION

TECHNICAL FIELD

The present invention relates to the field of workflow transaction processing in computer systems. More particularly, the invention relates to hierarchical transactions and compensation in computer systems.

BACKGROUND OF THE INVENTION

Workflow applications are related to businesses, governments, and other organizations where information and work product flows between various persons or departments. Workflow generally is the flow of information and control in such organizations. In a business setting, workflow processes include sales and order processing, purchasing tasks, inventory control and management, manufacturing and production control, shipping and receiving, accounts payable, and the like. Businesses continually strive to define, document, and streamline such processes in order to effectively compete.

Computer systems and associated software now provide tools with which businesses and other organizations can improve workflow. Software tools may be used to model business workflow processes or schedules and identify inefficiencies and possible improvements. In addition, where a process involves exchanging data between people, departments, plants, or even between separate companies, computer systems and networks can be used to implement such exchanges. These systems and software tools are further able to implement large-scale computations and other data or information processing which typically are associated with business related information. Automation of such information processing has led to many efficiency improvements in the modern business world; and workflow management includes effective management of information flow and control in an organization's business processes. Automation of workflow management is now allowing businesses and other organizations to further improve performance by executing workflow transactions in computer systems, including global computer networks, such as the Internet.

Many applications for workflow tools are internal to a business or organization. With the advent of networked computers having modems or other type communications links, computer systems at remote locations can now communicate easily with one another. Such enhanced communication allow computer system workflow applications to be used between remote facilities within a company. An example includes forwarding a customer order from a corporate headquarters to a remote field sales office for verification by an appropriate sales person, and returning a verification to the headquarters. Workflow applications also can be of particular utility in processing business transactions between different companies. In a typical application, two companies having a buyer-seller relationship may desire to automate generation and processing of purchase orders, product shipments, billing, and collections. Automating such processes can result in significant efficiency improvements which are not otherwise possible. However, this inter-company application of workflow technology requires co-operation of the companies and proper interfacing of the individual company's existing computer systems.

Thus far, workflow application tools have been developed which provide some capability for automating business workflow by defining workflow applications. Many business transactions are of a short duration. For example, a buyer may wish to transmit a purchase order number along with a list of products being purchased to a seller, and the seller may wish to respond with a confirmation of the order and an expected shipment date. This type of transaction may involve a general consumer purchasing products from a retailer, or alternatively two large corporate entities which do business regularly. The data associated with the order and the confirmation may be relatively small and the transmission time for the data may be on the order of fractions of a second. A workflow application running in a computer system may allocate system resources to the transaction during its pendency, which is generally very short—i.e. has a small latency. In this scenario, the system would use a conventional database transaction, i.e. an ACID transaction. An ACID transaction locks database information for the duration of the transaction. However, there are other types of business workflow transactions which have significantly longer durations and which may occupy system resources for an unacceptably long time. Such transactions often are called long running transactions.

Examples of long running transactions may include manufacturing or production control systems wherein a product is manufactured according to a particular workflow. It is common for a product to be manufactured in separate subassemblies, possibly at remote facilities. In such a situation, the time between production initiation and completion may be days, weeks or even months. A workflow application which tracks or manages progress of such workflow may be resident in a computer system for a very long time. Moreover, the application may wait several weeks for the product to reach an intermediate assembly stage, perform some bookkeeping function which lasts for several seconds, and then remain waiting again for several days for the next production stage. Such long running transactions may occupy system resources for unacceptable periods of time, while performing a relatively small amount of work. Consequently, there remains a need for workflow application tools which can execute long running transactions in a computer system, while utilizing system resources judiciously.

System resources in this regard, may include allocated space in memory for executable code and associated data, as well as permissive access to databases. In order to maintain data coherency, access to certain elements of data may be restricted to (exclusively allocated to), a specific instance of a workflow transaction until the transaction completes, (e.g., aborts or commits). Access to these data elements is denied to other transactions or objects while the transaction of interest is active. Once a running transaction successfully completes, or commits, the data is unlocked (e.g. becomes available for access by other transactions or programs). On the other hand, if the transaction fails or aborts, a transaction log is consulted and data manipulations performed by the aborted transaction are undone, (e.g., rolled back).

Heretofore, transaction commit rules and roll-back methods have been provided in order to ensure ACID properties of transactions. Transactions have conventionally been thought of as collections or groupings of operations on physical and abstract application states. ACID properties include atomicity, consistency, isolation, and durability.

Atomicity refers to a transaction's change to a state of an overall system happening all at once or not at all. Consistency refers to a transaction being a correct transformation of the system state, and essentially means that the transaction is a correct program. Although transactions execute concurrently, isolation ensures that transactions appear to execute before or after another transaction, because intermediate states of transactions are not visible to other transactions until the transaction commits (e.g., the data is locked during execution). Durability refers to once a transaction completes successfully (commits), its activities or its changes to the state become permanent and survive failures.

In conventional transaction processing systems and methods, an application program starts a new transaction, and thereafter, the operations performed by the program are part of the transaction until the transaction commits or aborts, including all operations performed by other programs on behalf of the transaction. If no failures occur, the program informs the outside world that the transaction is a complete and correct transformation by committing. Otherwise, the transaction aborts and data manipulations, messages, etc. are undone by roll-back procedures. To an outsider, the transaction appears to be atomic, because the transaction either commits (its changes to the data have been made), or it aborts (no changes have been made, or the changes have been rolled-back). The atomicity property is thus assured through the commit protocol of the transaction and through the roll-back procedure.

With regard to the isolation property, conventional systems and methods implement a commit rule, whereby access to data associated with an action within a root transaction is restricted to the action until the root transaction commits or aborts. Only when the root transaction has either committed (thus assuring validity and coherency of data associated with one of its component actions), or aborted (thus assuring that invalid or incoherent data manipulations, messages, etc., have been undone), is the data unlocked, thereby allowing access to other programs and actions. Thus, the commit/roll-back protocols and procedures, together with data locking implementation, have heretofore enabled the isolation property.

For long running transactions, data locking may be undesirable, since other actions or programs may be prevented from running due to the unavailability of data access, (e.g., the data needed by the actions has been locked). For example, accounting transactions may be prevented from accessing an inventory database to query inventory of a product subassembly because a long running production control transaction has exclusive access to this data during tracking or managing production of certain units of manufacture which include the subassembly. Locking database resources for significant durations reduces system scalability. In addition to restricting data access with respect to other programs, actions, etc., prior art systems and commit rules effectively restrict data access by monitoring tools, such as database query tools. This has heretofore prevented fine-grained monitoring of schedule status.

Furthermore, there exist situations where conventional commit rules and rollback techniques cause operational inefficiencies. Where a transaction includes a large number of actions which execute sequentially, the last action may fail after previous actions have successfully completed. Conventional roll-back methods typically require that all work done by successful actions be undone, after which the transaction containing the many actions is aborted. Rolling back work of all prior transactions may itself involve a large amount of work, and require allocation of system resources. Moreover, some work that is being rolled back may have been valid, and may not need to be redone.

Prior attempts at nesting transactions within transactions ensured ACID properties through a commit rule wherein the results (e.g., data, messages, etc.) associated with a completed sub-transaction are accessible only to a root or ultimate parent transaction until the root or ultimate parent transaction itself commits or aborts. Under this conventional rule, the sub-transaction will finally commit (e.g., release its results to the outside world) only if it has completed successfully, and all its ancestor transactions up to the ultimate parent or "root" transaction have committed. Consequently, data associated with a sub-transaction becomes accessible to the world only if the sub-transaction's ultimate parent or "root" transaction has committed or aborted.

SUMMARY OF THE INVENTION

According to the present invention, transaction boundaries of a schedule are defined by a user, and a run-time system executes the schedule. As used herein, the term schedule means an application, which may comprise, for example, a workflow application. A graphical user interface or a schedule definition language may be used to define groups or sets of component actions within a schedule. Transaction boundaries are determined based on the transactional scope of the groupings. Transactions may include sub-transactions. Hierarchical relationships may be formed between transactions within a schedule. The schedule may thus comprise hierarchical transactions, which may be compensated according to various aspects of the invention. The defined schedule can subsequently be bound onto specific technologies using binding tools. Instances of the schedule list are then created for execution. A run-time engine according to the invention stores a schedule state at transaction boundaries, allowing fine granularity for users to perform schedule-monitoring functions, and improve system error recovery. In addition, the invention provides a method of committing hierarchical transactions which allows a user to allow access to data based on the user-defined transaction boundaries of the schedule. The invention includes a method and a system for executing a schedule in a computer system, as well as a computer-readable medium having computer-executable instructions for performing the steps of the inventive methods.

According to one aspect of the invention, a method for executing a hierarchical transaction having a parent transaction and a sub-transaction is provided. The method comprises executing an action (or a set of actions) associated with the sub-transaction and committing the sub-transaction upon successful completion of the actions associated therewith, thereby allowing access to data associated with the actions according to a transaction boundary associated with the sub-transaction. The method provides selective restriction of access to the data associated with an action (or a set of actions) in the schedule according to at least one user-defined transaction boundary and the state of the actions. The method thus allows an action's associated data to be unlocked as soon as its immediate hierarchical parent transaction commits. Access is then allowed to other objects, programs, etc. even though the parent transaction may be a component inside another hierarchical transaction.

The invention further includes a method and system for selectively compensating at least one action according to a compensation parameter and at least one transaction boundary after abortion of another action. This selective compensation allows a user to relax the conventional isolation property through the above mentioned selective data access restrictions, while providing a method for maintaining data validity and coherency on an as-needed basis.

Another aspect of the invention includes a method and system for storing schedule state information to a storage medium based on a transaction boundary within the schedule. In addition, the invention provides for selectively obtaining at least a portion of the schedule state information from the storage medium, and selectively monitoring the schedule execution based on at least a portion of the schedule information obtained therefrom. The current state of the schedule can be determined, either by queries to the storage medium holding the stored schedule states (history reporting), or by monitoring the data stream being stored as transaction boundaries are encountered (event monitoring). Allowing the user to so define the logical transaction boundaries in the schedule definition, therefore allows fine-grained access to schedule status information with the capability of generating and analyzing history reports for the schedule execution. Further provided, is a computer-readable medium having computer-executable instructions for performing the steps of the above methods.

In accordance with one aspect of the invention, a method is provided for executing a schedule, which comprises a schedule state (e.g., the current state of the schedule) and a plurality of transactions. The transactions may include a transaction boundary, a transaction state, and at least one action having an action state and data associated therewith. The method includes executing the actions according to the schedule, and committing the transaction upon successful completion of an action associated therewith, according to at least one transaction boundary associated with the action and the action state.

In accordance with another aspect of the invention, a computer-readable medium is provided having computer-executable instructions for executing a schedule which has a schedule state and a plurality of transactions. The transactions may include a transaction boundary, a transaction state, and at least one action having an action state and data associated therewith. The computer-readable medium has computer-executable instructions for executing the actions according to the schedule, and committing at least one transaction upon successful completion of an action associated therewith.

BRIEF DESCRIPTION OF THE DRAWINGS

The foregoing and other aspects of the invention will become apparent from the following detailed description of the invention and the attached drawings in which.

DETAILED DESCRIPTION OF THE INVENTION

Figure 1:
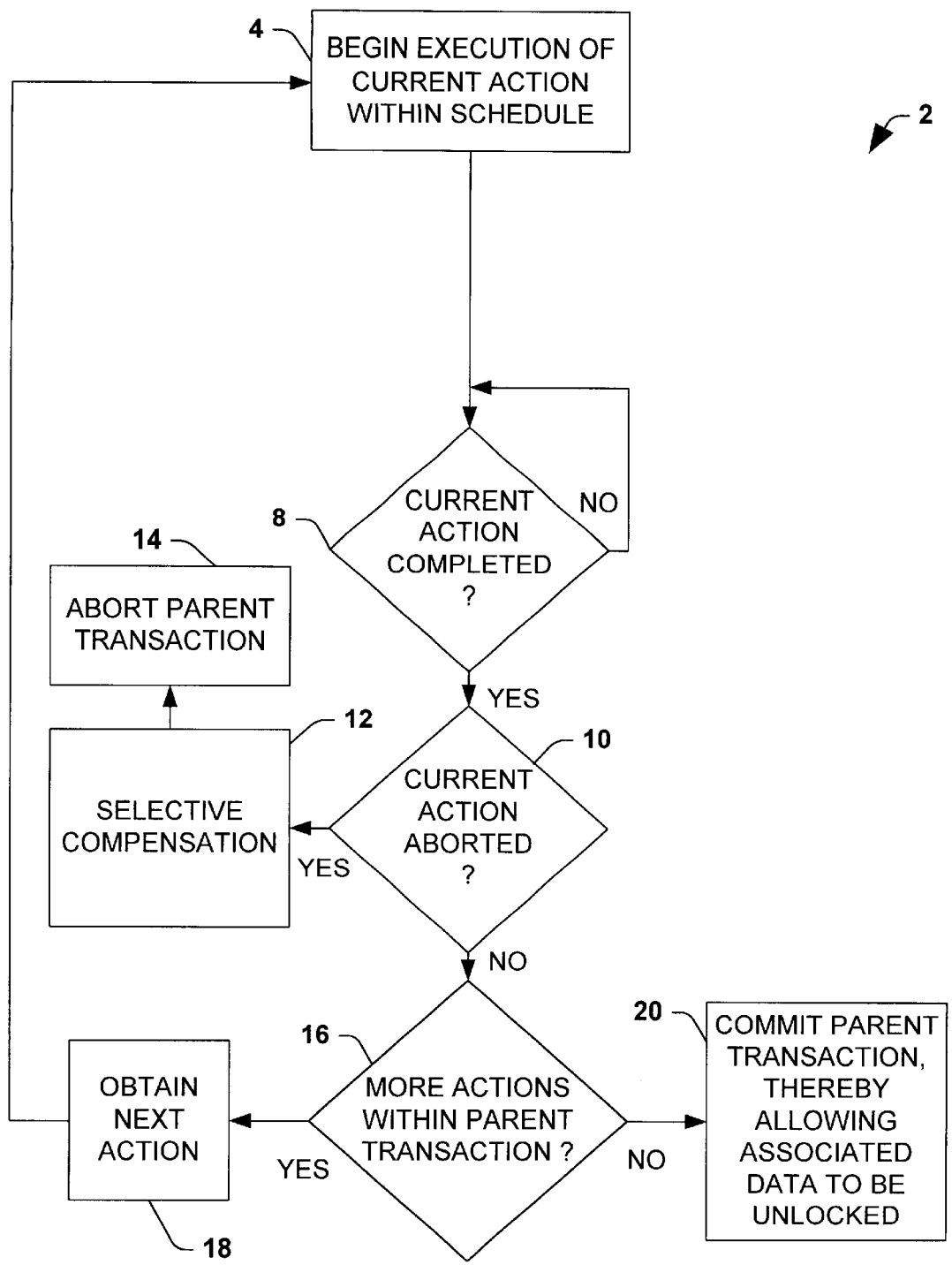
FIG. 1 is a flowchart illustrating a method for executing a schedule including selectively restricting access to data associated with an action based on a transaction boundary in accordance with the present invention.

The following is a detailed description of the present invention made in conjunction with the attached figures, wherein like reference numerals will refer to like elements throughout. According to one aspect of the invention, FIG. 1 illustrates a method 2 for executing a schedule including hierarchical transactions. The methods illustrated and described hereinafter, may be embodied in a computer-readable medium, (not shown), having computer-excecutable instructions for performing steps of the methods in accordance with the present invention.

In a nested transaction architecture prior art methods and systems commit a sub-transaction, thereby allowing the data associated therewith to be unlocked, only when the ultimate ancestor transaction (e.g., "root" transaction) has committed. According to the present invention, a hierarchical transaction commits when it has successfully completed, regardless of whether it's ultimate parent or root transaction has committed. As a result, data associated with an action may be selectively unlocked, (e.g., access thereto allowed to programs, etc., outside the schedule) when the action's immediate parent transaction commits. By this method, the outside world need not wait for the root transaction to commit in order to access data associated with the action, thereby reducing average time applications, programs, etc., spend waiting to access locked data. Hierarchical transaction boundaries established by a user while defining the schedule may be used at run-time to determine when a hierarchical transaction commits, and thus when the data associated therewith may be unlocked Execution of an action within a schedule begins in step 4 of FIG. 1 wherein an action is initialized. The data associated with an action may have been locked prior to execution of the action, for example, upon beginning execution of an action, when the immediate parent transaction began execution, or when the ultimate parent or "root" transaction began execution. While the data is locked, no other actions, programs, etc., may access the data. In this way, data coherency is maintained with respect to the current action. At step 8 a determination is made as to whether the action has completed, and if so, decision step 10 determines whether the current action has aborted or completed successfully. If the current action has aborted, the method 2 proceeds to step 12, wherein selective compensation methods may be employed to ensure data validity and/or coherency before the transaction is aborted in step 14.

Alternatively, if the current action has successfully completed at step 10, decision step 16 determines whether there are more actions within the parent transaction. If so, the next action is obtained in step 18, and execution thereof proceeds in step 4. If no other actions remain in the parent transaction at step 16, the parent transaction commits at step 20. This results in the data associated with the current action, as well as other actions within the parent transaction being unlocked. Thereafter, the unlocked data is accessible by the outside world, including programs, database access tools, other schedules, etc. The illustrated method thus provides faster access to data associated with committed actions within hierarchical transactions than do conventional methods and systems, as discussed in greater detail hereinafter.

Figure 2:
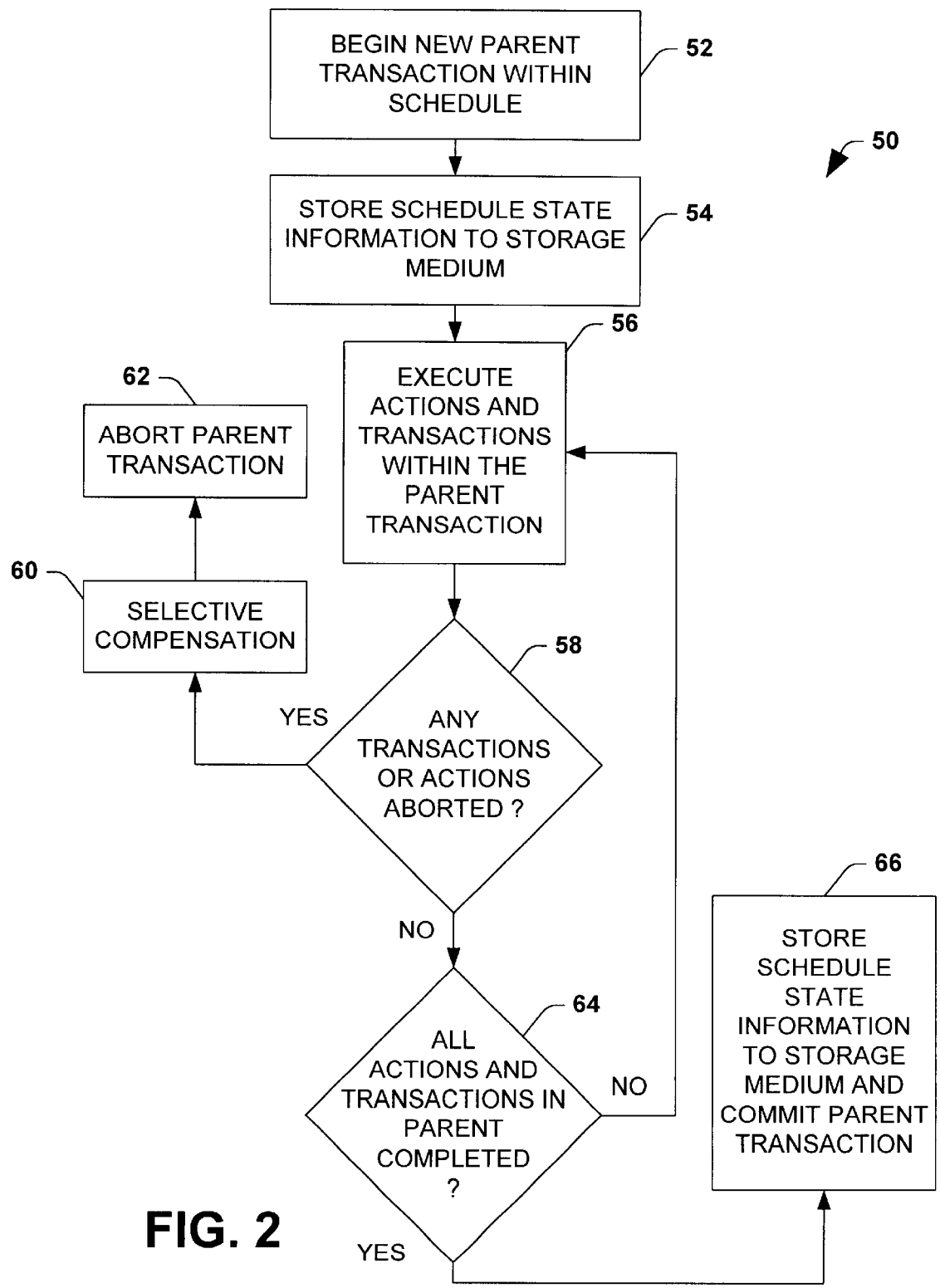
FIG. 2 is a flow chart illustrating a method for executing a schedule including storing schedule state information in a storage medium based on a transaction boundary in accordance with the invention.

Referring now to FIG. 2, another aspect of the invention is illustrated including a method 50 for executing a schedule wherein schedule state information is selectively stored to a storage medium based on transaction boundaries. Such a method provides a user fine-grained access to such information using database query tools and the like. Fine-grained data access may be advantageous where a user needs to know whether a hierarchical sub-transaction has completed successfully while an ultimate parent or "root" transaction is still executing. A parent transaction begins execution in step 52, after which schedule state information (such as, for example, the current state of actions and/or transactions within the schedule), is stored to a storage medium in step 54. Such information may tell a user, for example, which transactions within the schedule are completed, which have aborted, which are executing, and/or which are awaiting execution. The storage medium (not shown) may be a non-volatile memory. However, any type of memory storage may be utilized and is contemplated as falling within the scope of the present invention. Thereafter, the actions and/or transactions within the parent transaction are executed in step 56. It is noted that any queries to the schedule state information in the storage medium at this point may be able to determine that the parent transaction is currently executing.

During execution of the parent transaction, if any hierarchical transactions or actions within the parent transaction abort, decision step 58 transfers execution to step 60 where selective compensation is employed, as will be discussed in greater detail infra, after which the parent transaction is aborted in step 62. If no hierarchical transactions or actions within the parent transaction abort at step 58, decision step 64 determines whether all of the hierarchical transactions and actions within the parent transaction have been completed. If not, execution continues to step 56. When all of the hierarchical transactions and actions associated with the parent transaction have been completed, the schedule state information is again stored in the storage medium at step 66. While the schedule state information has been illustrated in FIG. 2 as being stored in or transferred to the storage medium both at the beginning and ending of a transaction, it will be recognized by those skilled in the art that such information may alternatively be stored in or transferred to the medium only at the end of the transaction within the invention. By the method of FIG. 2, the user defined transaction boundaries are employed to store schedule information in a storage medium, whereby the granularity of the information accessible from the storage medium may be as fine as the user desires. For example, where a user defines many hierarchical or other transaction boundaries in a schedule, the information about the schedule state available from the storage medium will be more specific than previously possible, thus providing better execution monitoring capabilities at runtime. It is worth noting that an aspect of the invention provides for a retry of the failed actions (or sub-transactions) with certain userdefined parameters (e.g., like number of times to retry, time between retry, etc.). This provides the user of the application with a method to overcome temporal failures within a long-running transaction e.g., temporary unavailability of a storage medium when an action (or a set of actions) wish to commit their state. It would be inefficient for this to terminate a root transaction which has been executing for weeks (or even months).

It would also be noted by those skilled in the art that this invention provides a mechanism for handling hierarchical transactions but is finely tunable by the user of such an application to have more fine-grained control of the running actions, e.g., tuning the schedule or other transaction to continue processing even though one or more sub-transactions have aborted. This enables the user to handle errors in a manner conducive to the user's specific application.

Workflow Applications Overview

Several aspects of the invention will hereinafter be described in detail in connection with application of workflow technology to an Internet customer transaction and a bank loan application process. Such applications have been selected because of their ability to clearly convey the various aspects of the invention. It will be appreciated, however, that the invention finds utility in a variety of applications Docket No. 147247w and that the illustrated processes are discussed merely to provide illustration and context for the various novel features of the invention.

Consumer Transaction Workflow

Figure 3:
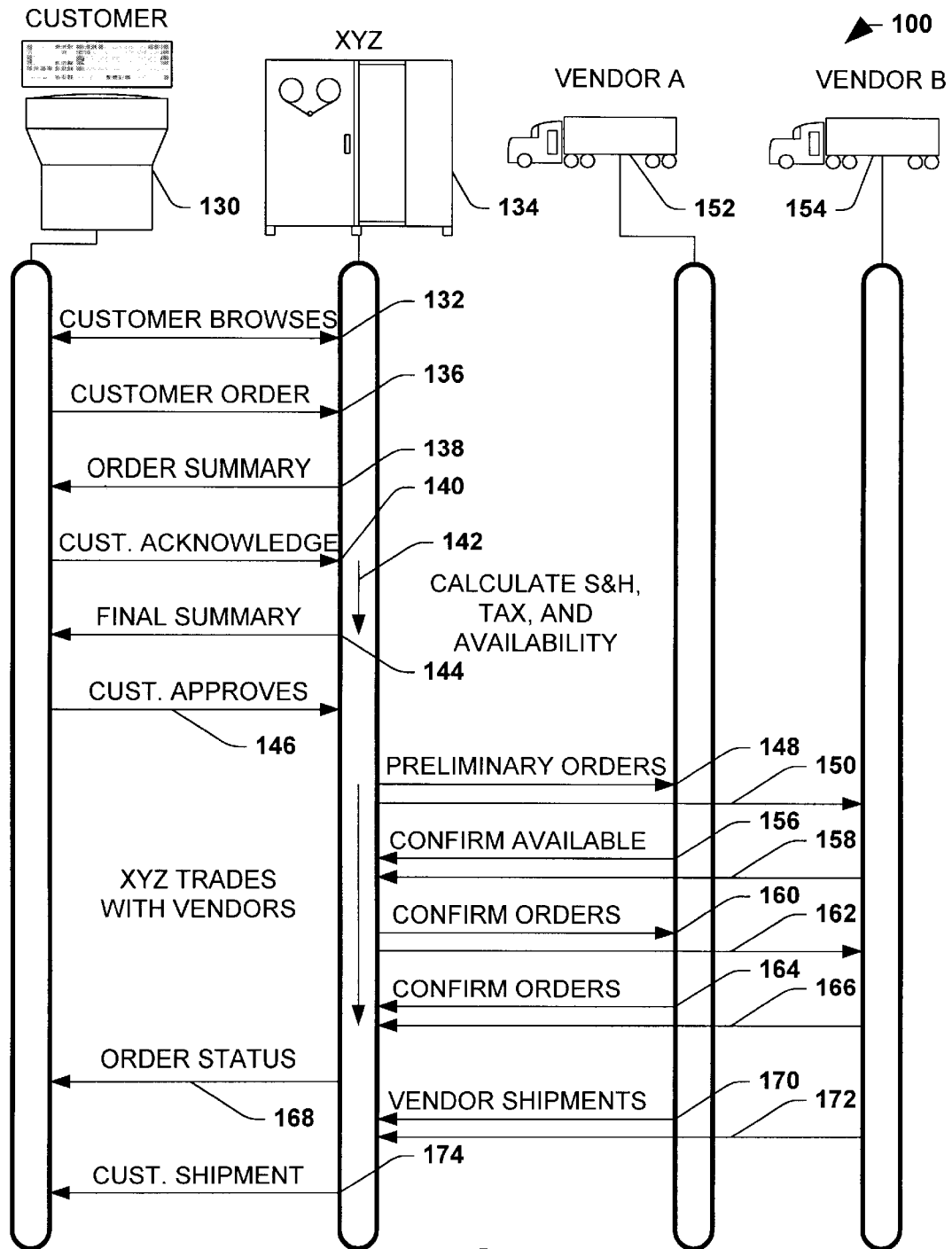
FIG. 3 is a schematic illustration of an exemplary workflow.

Referring now to FIG. 3, an exemplary interactive workflow 100 is illustrated, wherein a customer having a computer 130 accesses the Internet at step 132 to browse the web page of XYZ Corporation 134. The customer 130 places an order 136, which is then summarized by XYZ 134 at 138. The summary 138 is acknowledged by the customer 130, and XYZ 134 then calculates the shipping and handling charges, taxes, and availability of the order 136 at step 142, and sends a final summary 144 to the customer 130 at step 144. The customer may then approve the order at step 146. Thereafter, XYZ 134 sends preliminary orders 148 and 150, respectively, to vendor A 152 and vendor B 154, which are confirmed by messages 156 and 158, respectively. XYZ 134 then confirms the orders with messages 160 and 162, causing subsequent confirmation messages 164 and 166 to be sent to XYZ 134 by vendors 152 and 154, respectively. At this point, XYZ 134 sends an order status message 168 to the customer 130. After the shipments 170 and 172 arrive at XYZ 134 from vendors 152 and 154, the desired product 174 is shipped to the customer 130.

Figure 4:
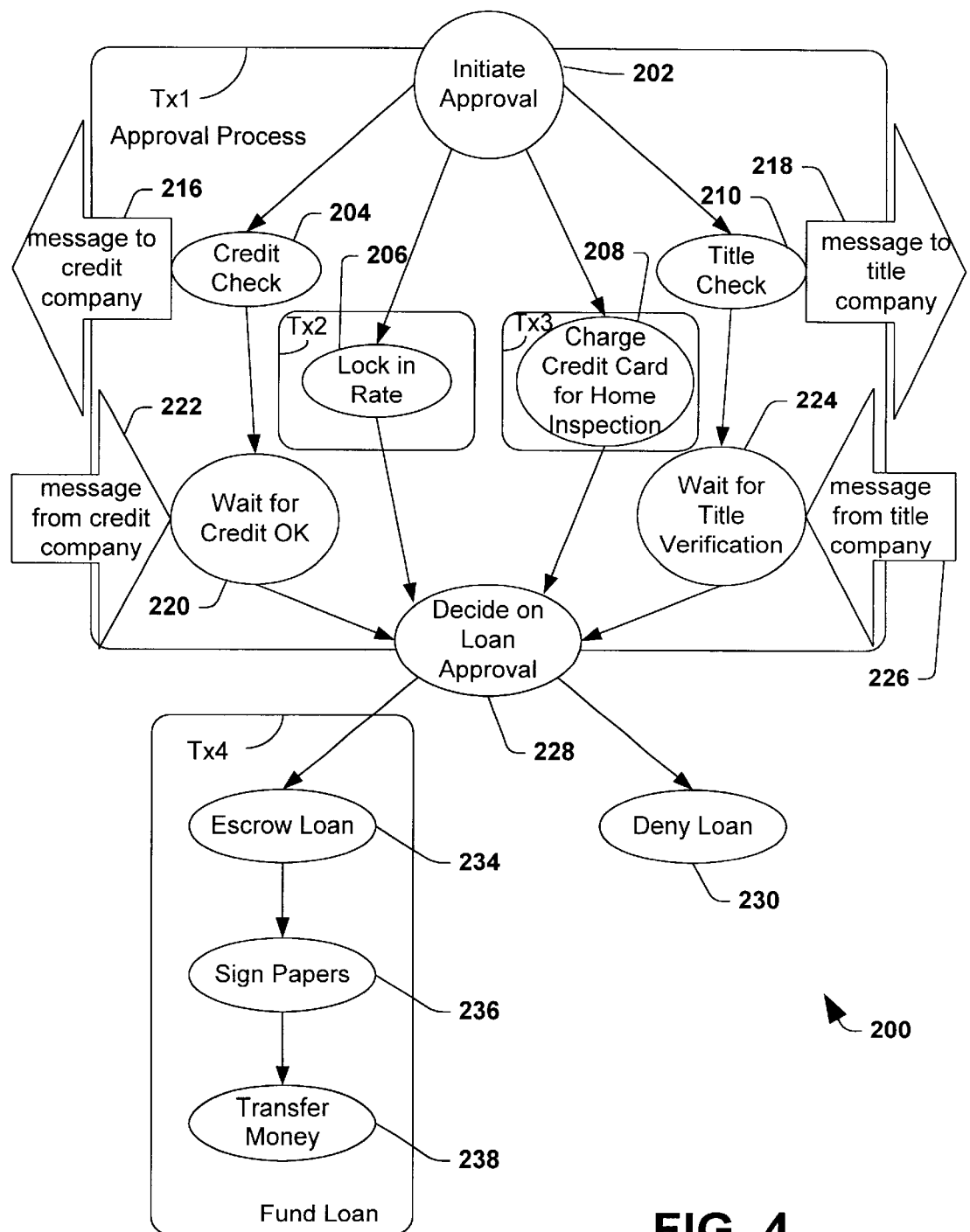
FIG. 4 is a block diagram illustrating a workflow schedule relating to a home loan application process.

Workflows such as that of the flow diagram of FIG. 4 may be defined in the form of a schedule for execution in a computer system. A schedule may include a set of actions having specified concurrency, dependency, and transactional attributes associated therewith. Each schedule has an associated schedule state, which includes a definition of the schedule, the current location within the schedule, as well as active or live data and objects associated with the schedule. Within a schedule, transaction boundaries may exist based on groupings of actions. In this regard, a transaction may encompass individual actions, or transactions, or groups thereof. As discussed further hereinafter, actions may be grouped into sequences, which are executed in serial fashion, as well as tasks in which the actions are executed concurrently. Based on the groupings, therefore, concurrency may be resolved for the actions and transactions within a schedule.

Actions correspond to the work that is done within a schedule and are the basic unit of composition therein. According to the invention, such actions may include attributes relating to latency and compensation, either alternatively or in combination, within the context of a schedule. In addition, concurrency of action execution may be embedded into a schedule via one or more concurrent constructs, for example, a task construct. Two types of actions exist; sink actions and source actions. Sink actions send externally originating stimuli to a schedule, thereby allowing external programs to advance the schedule state. These stimuli may be an event, a message, or a call. In the case of an event, the running schedule acts as a subscriber. Where the first action in a schedule is a sink action, a new instance of a schedule will be instantiated as a result of a message (or call or event) being received.

Source actions drive method calls on components. Such source actions typically instantiate a component, (create an instance of the component, unless the action refers to a pre-created instance of the component), call a method on the instance, and subsequently release the reference to the instance if it is not used later in the schedule.

When an application executes a schedule, an instance of a scheduler engine is created and the schedule and an associated binding are loaded. Actions, moreover, may include information regarding the expected or actual completion time or latency in accordance with the invention. This information may be embedded in the schedule definition when the schedule is being defined or when a binding is being created. In addition, latency attributes may be provided dynamically at runtime based on historical or predictive information about the latency of the action.

Ports are used by a schedule to define references to a component instance. Ports may be of type sink or source. Sink ports are entry points into a schedule for an external event to advance the schedule state. Source ports are used to send messages. A source port may also map to a method call by the schedule instance on a component instance that the port is bound to. References in a schedule to a port are associated with or bound to references to a message queue (or a component) by a process called binding. The schedule is thus created with reference to particular technologies and components that implement the desired behavior. Different bindings may be created for a single schedule, each binding specifying the particular components to be used in a given application. In practice, a schedule may be defined for an inter-business process, and reused for several combinations of businesses, wherein a different binding is created for each company implementing the process. The schedule itself is therefore portable.

Schedules may be created or defined using various workflow tools including a scheduler language and graphical user interfaces. The schedule definition includes port references, action definitions, task and sequence definitions, transaction definitions including definitions of action groupings within transactions, transaction boundaries, compensation parameters or attributes, and concurrency information. Constants can be provided to a schedule as initialization parameters by building the constants into the schedule as instance parameters when the schedule is instanced, as well as by invoking a component associated with a source action within the schedule. In the latter case, the parameters of the invoked method represent the initialization parameters.

Once a schedule is defined, a binding is created which resolves references in the schedule to ports into references to specific components. As discussed above, several different bindings may be created for a single schedule, according to the specific technology with which the schedule is to be employed. Particular bindings are created according to the specific technology using binding tools such as software programs.

Loan Application Workflow Schedule

Figure 5:
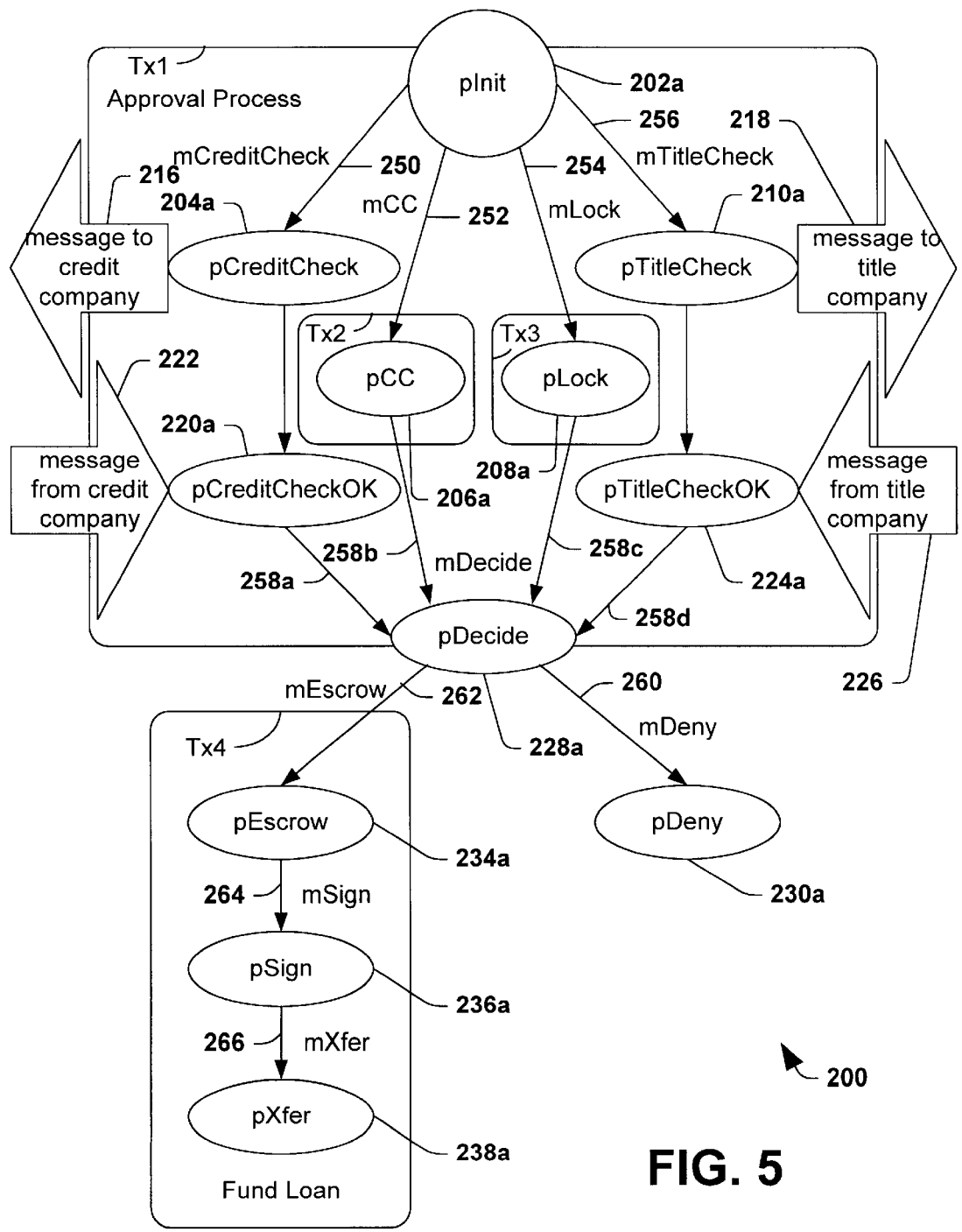
FIG. 5 is a block diagram illustrating the workflow schedule of FIG. 4 relating to a home loan application process with messages and ports abstracted.

FIGS. 4 and 5 illustrate block diagram representations of an exemplary loan application workflow schedule. This example will be used hereinafter to illustrate various aspects of the present invention. However, it will be recognized that many different applications are possible using the present invention, and that the illustrated example is not a limitation thereof. The loan application process of FIGS. 4 and 5, moreover, can be implemented in the exemplary operating environment described hereinafter, as well as other systems.

FIG. 4 illustrates a schedule 200 for executing a loan application approval process in which a loan applicant, not shown, has applied for a loan related to home ownership. Once the loan officer, not shown, has prepared the application, the application approval process begins at action 202. With the approval process initiated, four concurrent actions are started including a credit check action 204, a lock in rate action 206, a charge credit card for home inspection action 208, and a title check action 210. Actions 206 and 208 are synchronous, and complete atomically within transactions Tx2 and Tx3, respectively. A transaction's changes to a state are atomic if either all of the changes happen, or none of the changes happen. The changes may include database changes and messages, as well as other acts. Actions 204 and 210 are asynchronous, and involve sending messages 216 and 218 to a credit company and to a title company, respectively.

Action 220 asynchronously waits for a credit OK reply message 222 from the credit company, and action 224 asynchronously waits for a title verification reply message 226 from the title company. The loan approval decision is made in action 228 based on a credit OK message from action 220, the locked loan rate from action 206 in transaction TX2, the credit card charge from action 208 in transaction Tx3, and the title verification from action 224. Based on the approval decision in action 228, either the deny loan action 230 or the actions of a fund loan transaction Tx4 are executed. Transaction Tx4 includes a sequence of an escrow loan action 234, a sign papers action 236, and a transfer money action 238. Transaction Tx1 contains all the work of actions 202–210, 220, and 228, and includes transactions Tx2 and Tx3.

FIG. 5 illustrates the schedule of FIG. 4 wherein components of the schedule are abstracted as ports and messages. In particular, actions 202, 204, 206, 208, 210, 220, 224, 228, 230, 234, 236, and 238 of FIG. 4 have been abstracted in FIG. 5 as ports pInit 202a, pCreditCheck 204a, pCC 206a, pLock 208a, pTitleCheck 210a, CreditCheckOK 220a, pTitleCheckOK 224a, pDecide 228a, pDeny 230a, pEscrow 234a, pSign 236a, and pXfer 238a, respectively. In addition, the messages represented as arrows between actions, have been abstracted as messages mCreditCheck 250, mCC 252, mLock 254, mTitleCheck 256, mDecide1 258a, mDecide2 258b, mDecide3 258c, mDecide4 258d, mDeny 160, mEscrow 262, mSign 264, and mXfer 266, as shown in FIG. 5.

Hierarchical Transaction Commit Rule

Figure 6:
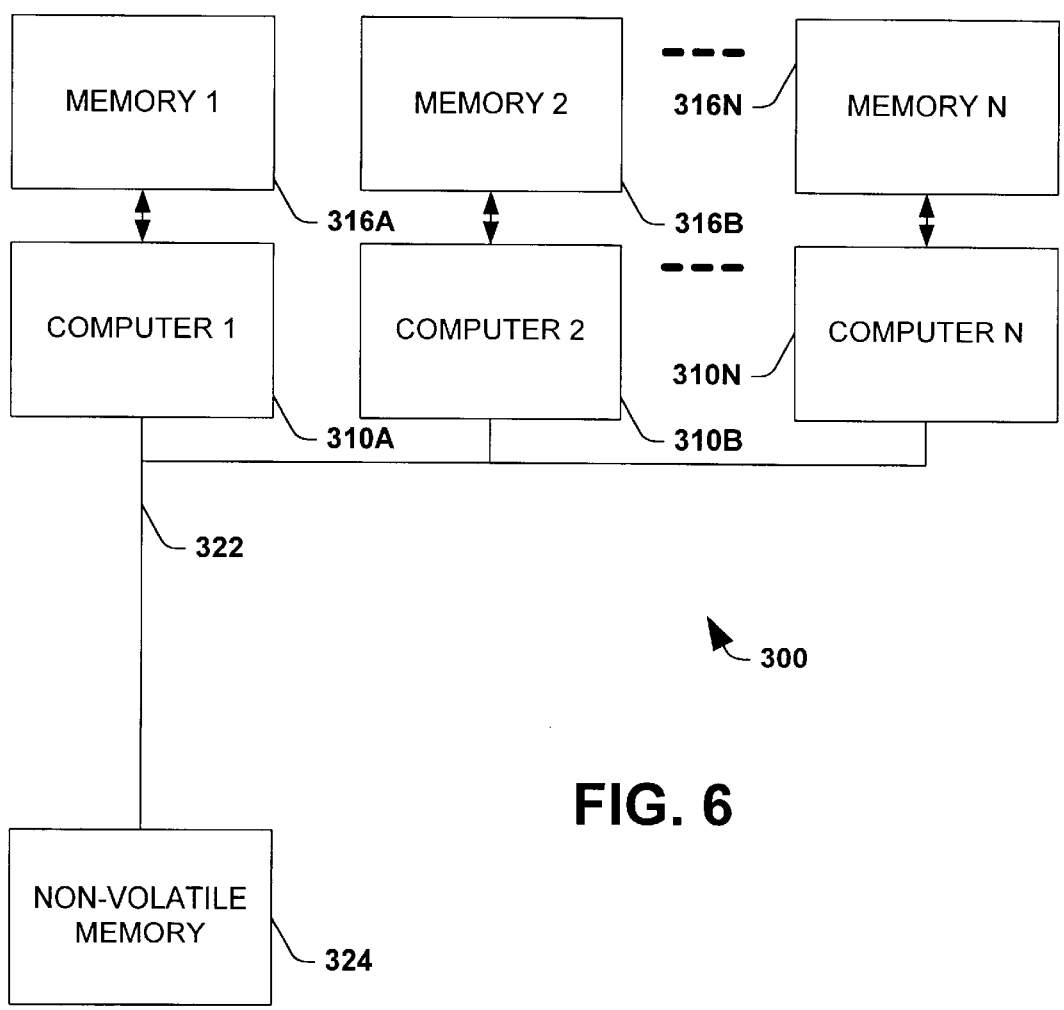
FIG. 6 is a block diagram illustrating a system for performing the methods in accordance with the invention.
Figure 7:
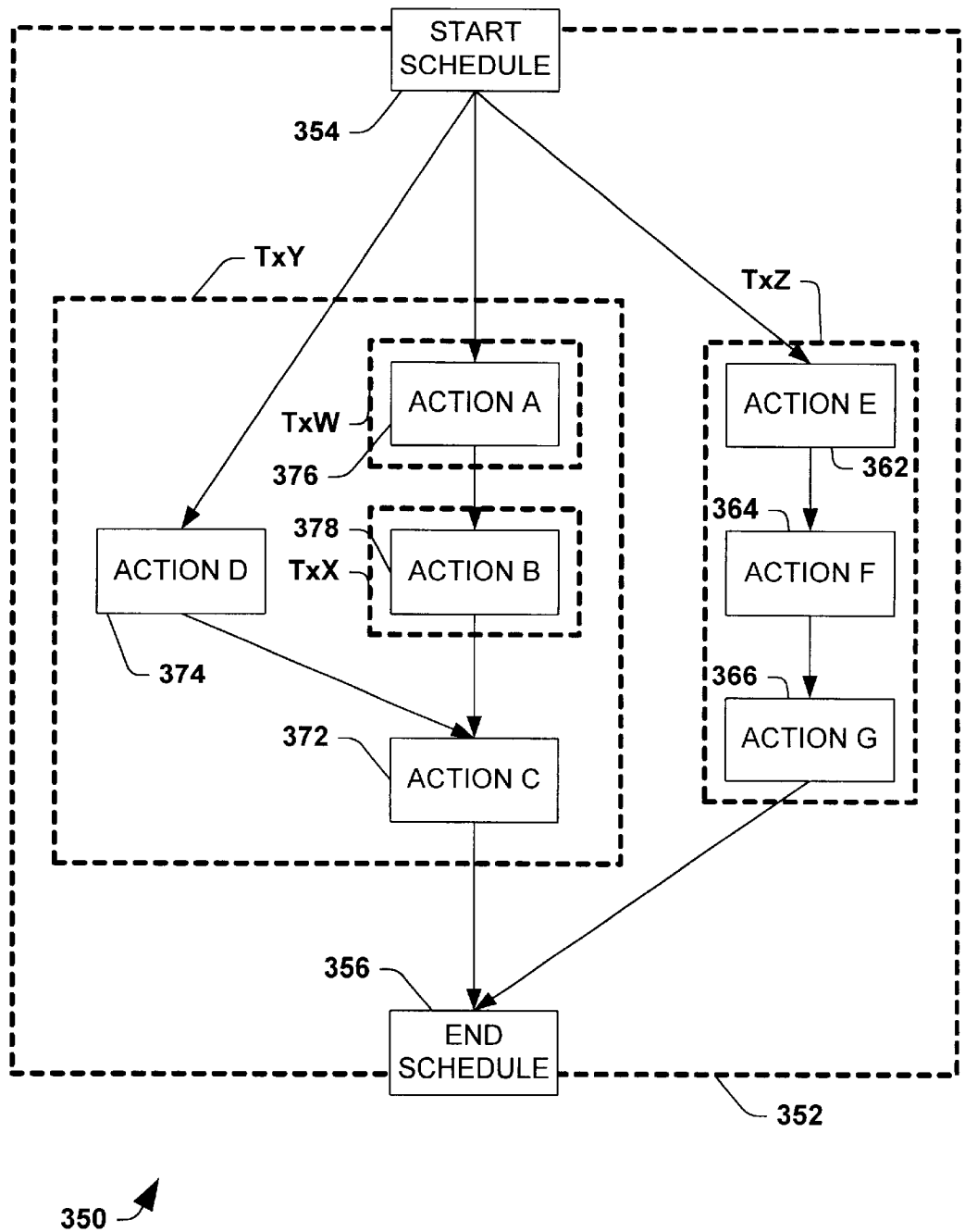
FIG. 7 is a block diagram illustrating an exemplary schedule having nested transactions in accordance with the invention.

Now that the basics of a workflow schedule are understood, an aspect of the present invention will now be discussed in greater detail, using an exemplary workflow schedule to aid in understanding the various features. Recall that FIG. I illustrates the method 2 for executing a schedule including committing a hierarchical transaction. Referring also to FIGS. 6 and 7, this aspect of the present invention will be described in greater detail, which comprises a method of executing a schedule in a computer system 300. FIG. 6 shows a system of networked computers including computer 1 310A, computer 2 310B, and computer N 310N (collectively referenced by number 310). The computers 310 each having a memory 316A, 316B, and 316N (collectively referenced by number 316) associated therewith, respectively. A network 322 connects computers 310 to one another as well as to a non-volatile storage memory unit 324. A workflow application, not shown, which is executed by computer 1 310A may include an exemplary schedule instance, described below with respect to FIG. 7.

In FIG. 7, a schedule 350 is illustrated graphically including a root (ultimate parent) transaction 352, with a start schedule block 354 and an end schedule block 356. Blocks 354 and 356 are shown merely for illustration, and need not themselves be actions. Within hierarchical transaction 352 are sub-transactions TxY, and TxZ, which may execute concurrently. Hierarchical transaction TxZ includes actions E, F, and G, 362, 364, and 366, respectively, which are organized into a sequence in which the actions E 362, F 364, and G 366 execute sequentially. Hierarchical transaction TxY includes sub-transactions TxW, and TxX in a sequence. The sequence including hierarchical transactions TxW and TxX executes concurrently with action D 374 within transaction TxY. Concurrently executing groupings of actions and transactions in this regard are called tasks. Thus action D 374 forms a task with the sequence of transactions TxW and TxX, within the hierarchical transaction TxY. Action C 372 executes after this task has completed, i.e., after the completion of both action D 374 and the sequence of hierarchical transactions TxW and TxX. Similarly, hierarchical transaction TxY forms a task with the hierarchical transaction TxZ within the ultimate parent or "root" transaction 352. Hierarchical transactions TxW and TxX include actions A 376 and B 378, respectively. According to the above example, each hierarchical transaction in FIG. 7 includes a transaction boundary illustrated as a dashed line. However, it will be recognized that other examples are possible within the scope of the invention, wherein some transactions include transaction boundaries, while others do not.

The schedule defined by a user includes hierarchical transaction boundaries such as those illustrated, the position of which is determined by logical grouping of hierarchical transactions and actions within the hierarchy of the schedule. The groupings are determined according to the desired execution characteristics of the components of the groups. For example, the user creating the schedule may know that transactions TxY and TxZ of FIG. 7 can executed independently because neither transaction needs to access data or results created or modified by the other. Consequently, the user may group these two transactions TxY and TxZ as a task, wherein the transactions execute concurrently. Conversely, the user may know that action C 372 requires that the results and/or data modifications performed by the sequence of transactions TxW and TxX as well as that of action D 374 be completed prior to execution of action C 372. Thus, the user may group these components into a sequence as shown in FIG. 7, wherein transactions TxW and TxX, and action D 374 execute before action C 372. Likewise, action D 374 may be grouped in a task with the sequence of transactions TxW and TxX where it is known that neither the action D 374 nor the sequence of transactions TxW and TxX rely upon the other's data or results in order to properly execute.

In addition to data interdependency issues, a user may group actions and/or hierarchical transactions within a schedule for monitoring purposes. For example, in accordance with the present invention, schedule state information may be stored in a storage medium at hierarchical transaction boundaries, as will be discussed in greater detail infra. A user may thus desire fine-grained monitoring capabilities with respect to certain actions at run-time. In this situation, the user may define certain hierarchical transactions to include a single component action, such as transactions TxW and TxX, in FIG. 7, each of which include single actions A 376 and B 378, respectively. In this regard, it will be appreciated that actions A 376 and B 378 could have been defined as within hierarchical transaction TxY without the sub-transactions TxW and TxX. Moreover, the user can define the hierarchical transaction boundaries, and although each transaction may employ such a transaction boundary, each transaction need not have such a boundary. In the illustrated example, the use of the hierarchical sub-transaction transaction boundaries for transactions TxW and TxX, advantageously provides for additional storage of schedule information to a storage medium at run-time, whereby, for example, a user can monitor the schedule execution to determine that the hierarchical transaction TxW has committed, and that the transaction TxX is pending. Without the inclusion of hierarchical transaction boundaries in the schedule for sub-transactions TxW and TxX, the user can only monitor the execution of the parent transaction TxY as a whole. Therefore, a user defining a schedule in accordance with the present invention, may define logical hierarchical transaction boundaries according to monitoring as well as data interdependency considerations, as may be desired.

Figure 8:
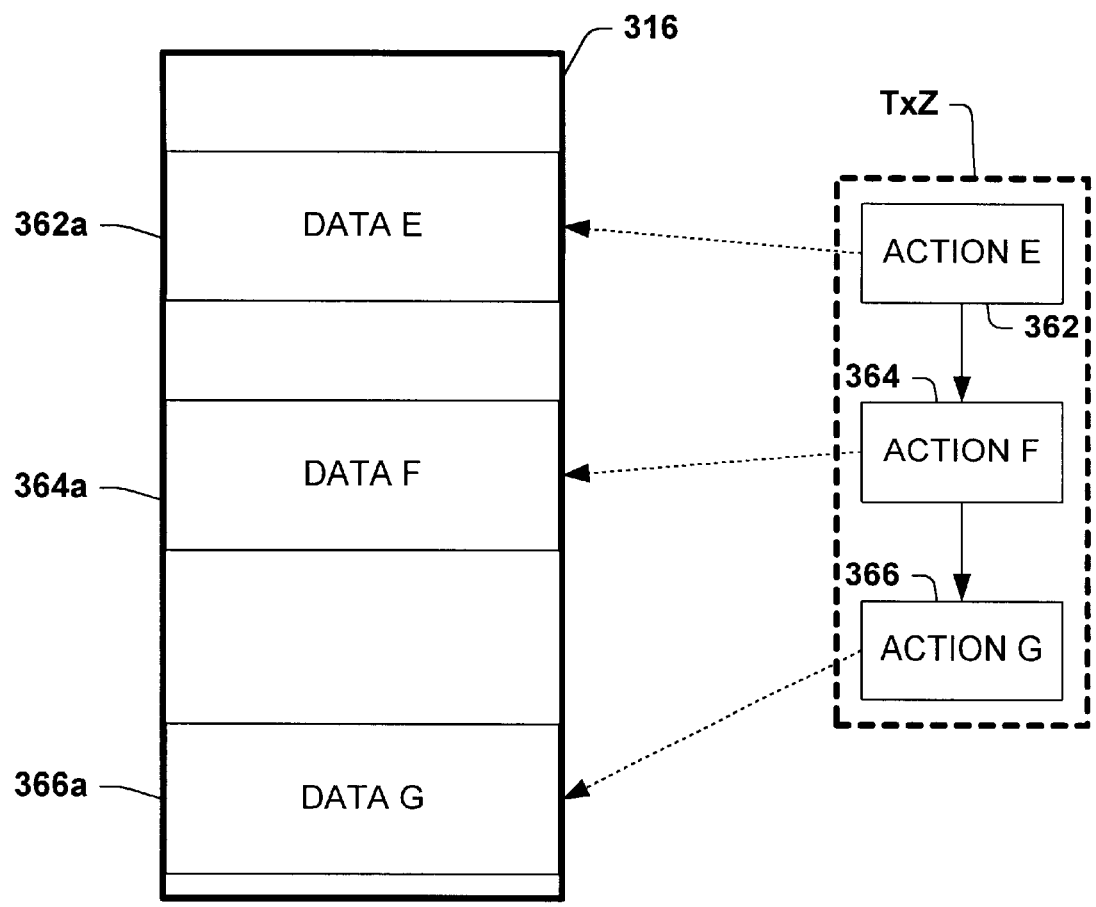
FIG. 8 is a block diagram illustrating one transaction of FIG. 7, and data associated therewith.

Referring to FIG. 8, transaction TxZ of FIG. 7 is illustrated together with data associated with component actions E 362, F 364, and G 366 which form a sequence within the transaction TxZ. The associated data is illustrated as residing within the memory 316A at execution, having connections to the computer 1 310 of FIG. 6. In particular, the data E 362a is associated with action E 362, the data F 364a is associated with action F 364 and the data G 366a is associated with action G 366, respectively. Those skilled in the art will appreciate that while the data 362a associated with action E 362 is shown to be one contiguous block of data in memory 316A, the data 362a may be located at a plurality of locations within the memory 316A, and/or within many different memory units such as, for example, the memories 316B and/or 316C in FIG. 6. Moreover, it will be recognized that messages, as well as data, may be associated with an action in a schedule, and that the selective locking and unlocking of data resulting from the commit rule methods discussed herein apply to data as well to messages and other information associated with an action or transaction.

Referring also to FIG. 1, a method of executing a schedule is illustrated wherein the transactions boundaries are used to commit hierarchical transactions and thereby to selectively restrict access to data associated with an action within the schedule. Using the schedule shown in FIG. 7 as an example, the details of the inventive method will now be described. At the start of the schedule 350, the action E 362 begins execution at step 4. During execution of the action E 362, access to the data 362a is denied to programs, actions, etc., outside of the schedule 350. The data locking may be implemented by the computer 310 of FIG. 6, or by other appropriate resource managers (not shown). In particular, the computer 310 may run an application program associated with the schedule execution which provides for selective locking of data. The completion of the current action E 362 is tested at decision step 8, and if completed, step 10 determines whether the action E 362 aborted. If the action E 362 aborted for any reason, the data 362a associated therewith may need to be compensated at step 12, as will be discussed further hereinafter. After selective compensation, the hierarchical transaction TxZ associated with the action E 362 is itself aborted at step 14 and the data 362a may then be unlocked e.g., access thereto is allowed to other programs and/or actions.

If the current action E 362 has completed successfully, then decision step 16 determines whether there are other unfinished actions or transactions within the hierarchical parent transaction TxZ. In this regard, it will be appreciated that the hierarchical transaction TxZ in FIGS. 7 and 8 is the parent transaction with respect to actions E 362, F 364, and G 366. In such hierarchical transactions as are illustrated, one or more sub-transactions are included within the hierarchical transaction boundary of another hierarchical (parent) transaction. The outer-most hierarchical transaction boundary is that of the ultimate parent or "root" transaction. Actions may be said to be associated with each other or with transactions, where they are each within the same ultimate parent or "root" transaction's transaction boundary.

After successful completion of action E 362, the decision step 16 of FIG. 1, determines that other actions (actions F 364 and G 366) remain within the hierarchical parent transaction TxZ at step 16. Accordingly, the next action F 364 is obtained according to the schedule in step 18, which begins execution at step 4. Execution proceeds through steps 8, 10, and 16, whereat it is determined that action F 364 has successfully completed, and that action G 366 remains within the hierarchical transaction TxZ.

Once action G 366 has been executed in similar fashion according to steps 4, 8, and 10, decision step 16 determines that no more actions or transactions need execution within the hierarchical parent transaction TxZ. Consequently, the hierarchical transaction TxZ is committed at step 20. Once the hierarchical transaction TxZ has committed, the data 362a, 364a, and 366a associated with the actions E 362, F 364, and G 366 of the hierarchical parent transaction TxZ may thereafter be unlocked. Had any of the component actions E 362, F 364, or G 366 aborted, steps 12 and 14 would have provided selective compensation of the affected data. In either case, once the data has been unlocked as a result of the commit rule, other actions, programs, schedules, etc. may access the data 362a, 364a, and/or 366a.

It will be noted at this point that the data 362a, 364a, and 366a associated with the component actions E 362, F 364, and G 366, respectively, remains locked until the immediate parent transaction 316 commits. Therefore, if the actions E 362 and F 364 had completed, and the action G 366 remained pending for a long time, outside entities, such as programs, objects, other actions, or schedules, etc. must wait for completion of this long latency action before being allowed to access the data 362a and/or 364a associated with the completed actions E 362 and F 364, respectively. If greater resolution in data availability is desired, a user could have defined individual transaction boundaries around each of the actions E 362, and F 364, as will be further appreciated in the discussion of transaction TxY of FIG. 7, infra.

Figure 9:
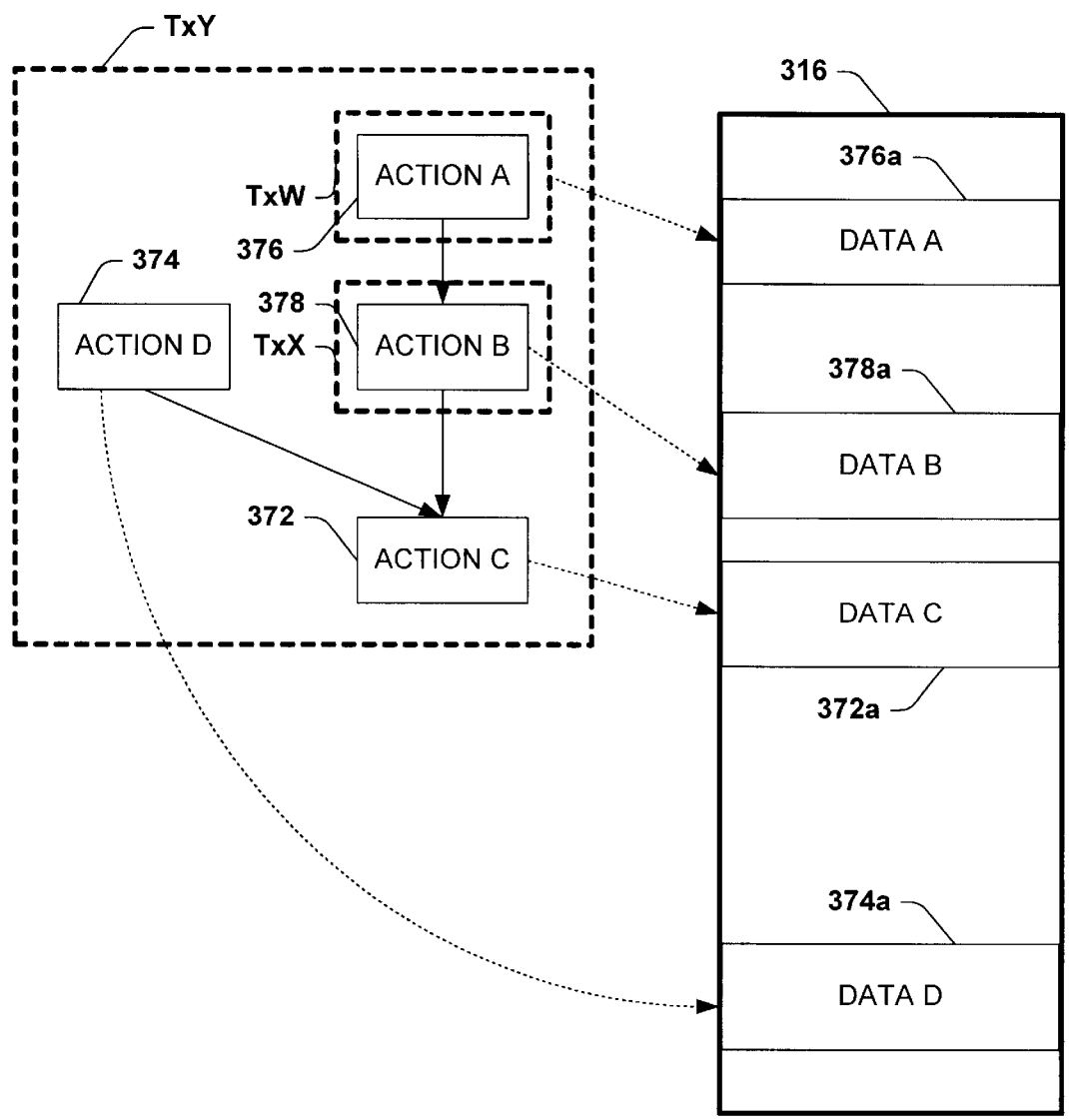
FIG. 9 is a block diagram illustrating another transaction of FIG. 7, and data associated therewith.

Referring now to FIGS. 1, 7, and 9, FIG. 9 shows the transaction TxY of FIG. 7, including sub-transactions TxW and TxX, as well as a portion of the memory 316 of FIG. 6, wherein data portions of the memory 316A are shown associated with actions within transaction TxY. In particular, the data A 376a is associated with action A 376, the data B 378a is associated with action B 378, the data C 372a is associated with action C 372, and the data D 374a is associated with action D 374. As discussed above with respect to FIG. 8, the data associated with the actions C 372, D 374, A 376, and B 378 may include messages as well as data portions within blocks of memory, and the data associated with an action need not reside within a contiguous portion of a specific memory.

The action A 376 begins execution in step 4 of FIG. 1, and execution proceeds through steps 8 and 10. Assuming the action A 376 completes successfully, the decision step 16 determines that no other actions remain within the transaction boundary of hierarchical sub-transaction TxW. Consequently, the hierarchical sub-transaction TxW commits at step 20, thereby allowing the data 376a associated with the successfully completed action A 376 to be unlocked. The same method is employed for execution of the action B 378 with respect to its associated data 378a. Assuming the action B 378 does not abort, execution thereof proceeds through steps 4, 8, and 10, whereupon the decision step 16 determines that there are no other actions within the hierarchical sub-transaction TxX. Accordingly, the hierarchical sub-transaction TxX commits at step 20.

In FIGS. 7 and 9, the action D 374 may be concurrently executing with the hierarchical sub-transactions TxW and TxX (i.e., the hierarchical sub-transactions TxW and TxX form a task with action D 374). Thus, action D 374 may complete before, after, or at the same time that the hierarchical sub-transactions TxW and TxX complete. Action D 374 executes in the same manner as actions A 376 and B 378 in accordance with the diagram of FIG. 1. Assuming the action D 374 does not abort step 16 determines that there are other actions (action C 372, and possibly actions A 376 and B 378), which remain within action D 374's hierarchical parent transaction TxY. Thus, the data D 374a associated with the action D 374 is not unlocked until these other actions have also completed.

It should be noted at this point, that had a logical transaction boundary been provided which included only action D 374, the data D 374a associated therewith, would have been unlocked via the commit rule of the invention prior to the completion of all the actions within the hierarchical transaction TxY, similar to the early unlocking of the data 376a and 378a by virtue of the hierarchical sub-transaction boundaries TxW and TxX provided in the schedule around the actions A 376 and B 378, respectively. In this example, therefore, it is seen that the user who defines the hierarchical transaction boundaries in a schedule may selectively determine when hierarchical transactions can commit, and thereby provide for early data unlocking on an action-by-action basis. The invention thus provides significant advantages in data accessibility in the context of, for example, long running transactions.

Once both action D 374 and the hierarchical sub-transactions TxW and TxX have completed, action C 372 is executed according to the method of FIG. 1. If successful, decision step 16 determines that no incomplete actions remain in the hierarchical parent transaction TxY, whereupon the parent transaction TxY commits, allowing the data 374a and 372a associated with the actions D 374 and C 372, respectively, to be unlocked.

Referring again to FIG. 7, since all the actions within the root or ultimate parent hierarchical transaction 352 have successfully completed, the parent transaction 352 can now, itself, commit. By virtue of the logical transaction boundaries within the schedule definition, the selective locking and unlocking of data associated with an action within the schedule can be achieved, whereby the user can provide for early unlocking of data based on the completion of the associated action, and the hierarchical transaction boundaries.

In the example discussed above with respect to FIG. 7, it is seen that had hierarchical transaction TxY committed before transaction TxZ, the data 372a and 374a (as well as the previously unlocked data 376a and 378a), would be unlocked prior to commission of transaction TxZ. Where, for example, the latency or execution time for the action F 364 is particularly long, the structuring of hierarchical transactions TxY and TxZ is advantageous since the data 372a, 374a, 376a, and 378a associated with the actions within hierarchical transaction TxY may be unlocked without having to wait for the long latency action F 364 to complete. This allows other programs, actions, etc., outside the schedule 350 to access the data 372a, 374a, 376a, and 378a, earlier than in the prior art systems and methods, consequently improving overall system performance. Long running transactions, and long latency actions, are but one example of the considerations to which the flexibility provided by the present invention can be employed.

The method described above for committing hierarchical transactions provides for relaxation of the isolation property of ACID transactions. In this regard, the assurance of data validity and/or coherency may be sacrificed if no method for data compensation is provided, when a hierarchical transaction or action aborts. In accordance with another aspect of the invention, selective compensation methods are provided, whereby the data associated with an action may be compensated based on the abortion of another action within the schedule, as well as the transaction boundaries therein, as discussed hereinafter.

Compensation

According to another aspect of the present invention, compensation may be used to recover or reconstruct data, which has been modified in the course of execution of a transaction which subsequently failed or aborted. Such transactions may be referred to as compensated transactions, which may comprise, for example, hierarchical compensated transactions. Selective compensation may be useful when certain actions within a transaction have already committed and modified their data, and subsequently, another action within the transaction aborts or fails. A user may want the system to reconstruct the data modified by the committed actions, prior to aborting the transaction. Further, it may be advantageous or desirable to send messages to other schedules, transactions, etc. to indicate that an action has aborted, or that data previously modified, is now to be restored, or even to indicate that the data will not be restored. The flexibility of selective compensation allows actions to commit their respective data as soon as their parent transaction commits, without necessarily waiting for their hierarchical ultimate parent or root transaction to commit. This frees up access to the data for use by other programs, actions, transactions, etc., which can substantially improve system efficiency, particularly where long running transactions are involved.

Figure 10A:
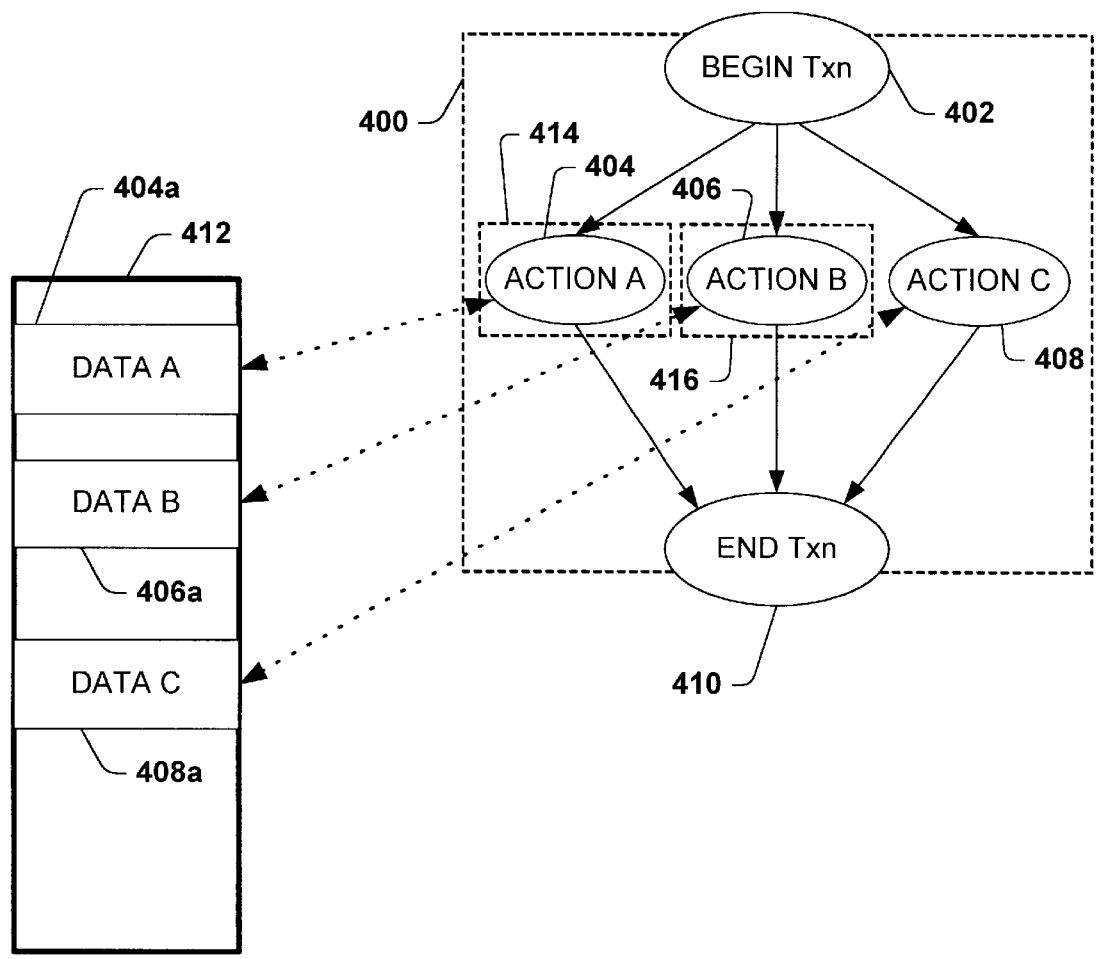
FIG. 10a is block diagram illustrating an exemplary workflow schedule transaction in accordance with the invention.

As discussed supra, FIG. 1 illustrates a method for executing a schedule including committing hierarchical transactions, resulting in selective unlocking of the data associated with an action. In step 10 it is determined whether the current action has aborted, and if so, step 12 performs selective compensation before the transaction is aborted in step 14. Referring now to FIG. 10a, a method for selectively compensating data associated with an action is discussed. A hierarchical transaction 400 is shown having a begin Txn action 402, action A 404, action B 406, action C 408, and an end Txn action 410. Sub-transactions 414 and 416 include actions 404 and 406, respectively. A memory 412 holds data A 404a, data B 406a, and data C 408a, which are associated with (operated on or otherwise used by), actions 404, 406, and 408, respectively.

While an action is executing, the data associated therewith may be locked, i.e., other objects may not access the data. According to the present invention, however, isolation need not be preserved within the transaction boundary of the hierarchical transaction 400. Thus, when an individual sub-transaction 414, for example, commits (completes and modifies its data), the associated data A 404a may be unlocked, i.e., any locks on the data A 404a may be released. By this relaxation of the data locking, the deleterious effects of long running transactions may be minimized or reduced with respect to allowing other actions, transactions, etc. to proceed, whereas had the data been further locked after action 404, committed, such actions, transactions would have to wait.

In the situation where a failure or abortion actually occurs, the present invention allows a user to decide what to compensate and how it will be done. The invention thus allows much more flexibility than the conventional methods (e.g., automatic roll-back). A log, not shown, is maintained for the hierarchical transaction 400, which records the operations performed within the transaction, including those of actions 404, 406, and 408, which may involve changing the data 404a, 406a, and/or 408a.

Figure 10B:
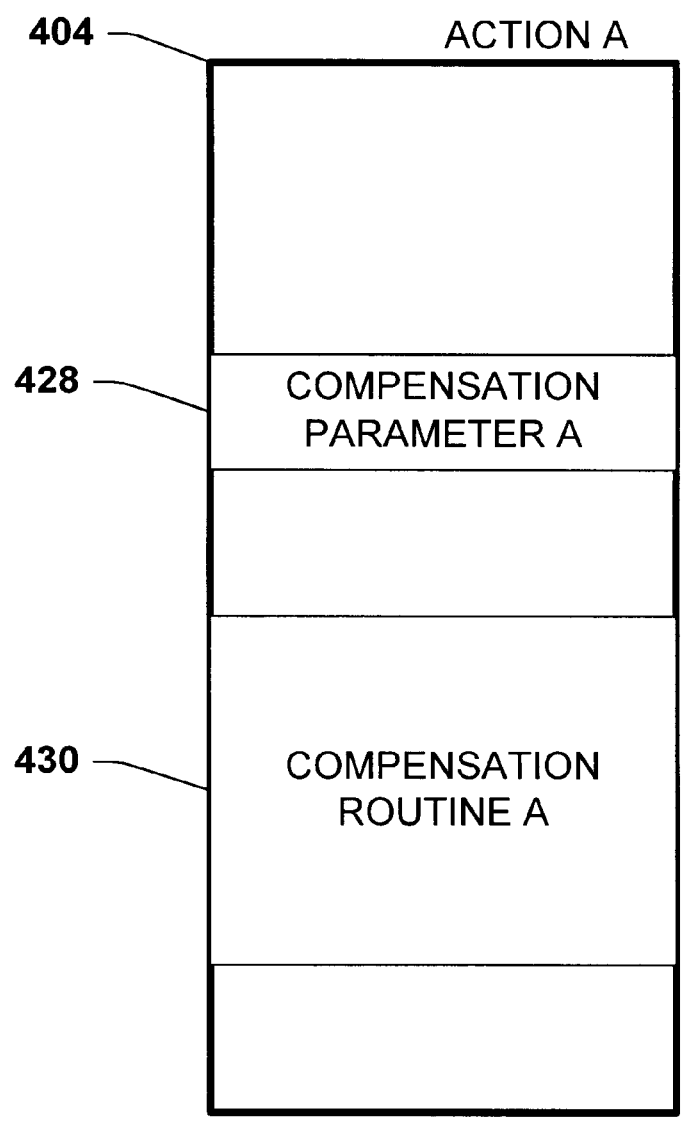
FIG. 10b is block diagram illustrating an exemplary workflow schedule action in accordance with the invention.

Referring also to FIG. 10b, action A 404 may include a compensation parameter 428 and a compensation routine 430 associated therewith. In FIG. 10a, the hierarchical transaction 400 ends, i.e. commits, when the action 410 has committed. Execution of the action 410, however, is dependent on the actions 404, and 406 (hence sub-transactions 414 and 416), and action 408 successfully completing, as shown in FIG. 10a. Consequently, if one or more of the actions 404, 406, and 408 fail or abort, the action 410 and hence the hierarchical transaction 400 must also fail or abort.

For illustration, it is assumed that during execution of the hierarchical transaction 400, action A 404 as well as action B 406 complete successfully, thereby allowing sub-transactions 414 and 416 to commit, after modifying the data A 404a and the data B 406a, respectively. After each sub-transaction commits, the data associated therewith is unlocked. Thereafter, other objects, including for example schedules, programs, transactions, and/or actions, etc., may read, write, or otherwise modify or rely on the modified data 404a and/or 406a. Assuming further that some time after sub-transactions 414 and 416 commit, action C 408 aborts or fails, the state of the data A 404*a* and data B 406*a* is unreliable, because after sub-transactions 414 and 416 committed, and before the action 408 aborted, data 404*a* and data 406*a* were unlocked. Hence, other objects, programs, etc., may have read, written, or otherwise modified or relied upon the data. This example illustrates why prior art transaction processing solutions would not allow nested transactions (within other transactions) to commit (and thus to "unlock" their associated data) prior to commission of the parent transaction. This prior art protection feature is sometimes referred to as isolation.

By the present invention, isolation requirements can be relaxed, thereby reducing the time that data is locked to the time when transactions which modify the data are actually running. Once an object, such as a hierarchical sub-transaction, is finished, the data associated therewith may be unlocked, thereby allowing others to access the data. Selective compensation provides a user with the ability to compensate for aborted or failed actions, etc., either by recreating the data that has or may have been modified, or by notifying other actions, programs, schedules, etc. that the data may have been unreliable. As opposed to the conventional methods, the present invention provides a flexible compensation method, which may include conventional automatic roll back, but is not limited thereto. Consequently, the aggregate time that data is locked may be decreased, and other objects are allowed access to data much sooner than was possible in the prior art. The present invention relaxes the prior art isolation requirement and allows data associated with one or more actions within a hierarchical root or ultimate parent transaction to be unlocked upon commission of a sub-transaction. Further, the present invention addresses the potential problem of unreliable data associated with unlocked actions using a method of selective compensation, as will be discussed in greater detail below.

Figure 10C:
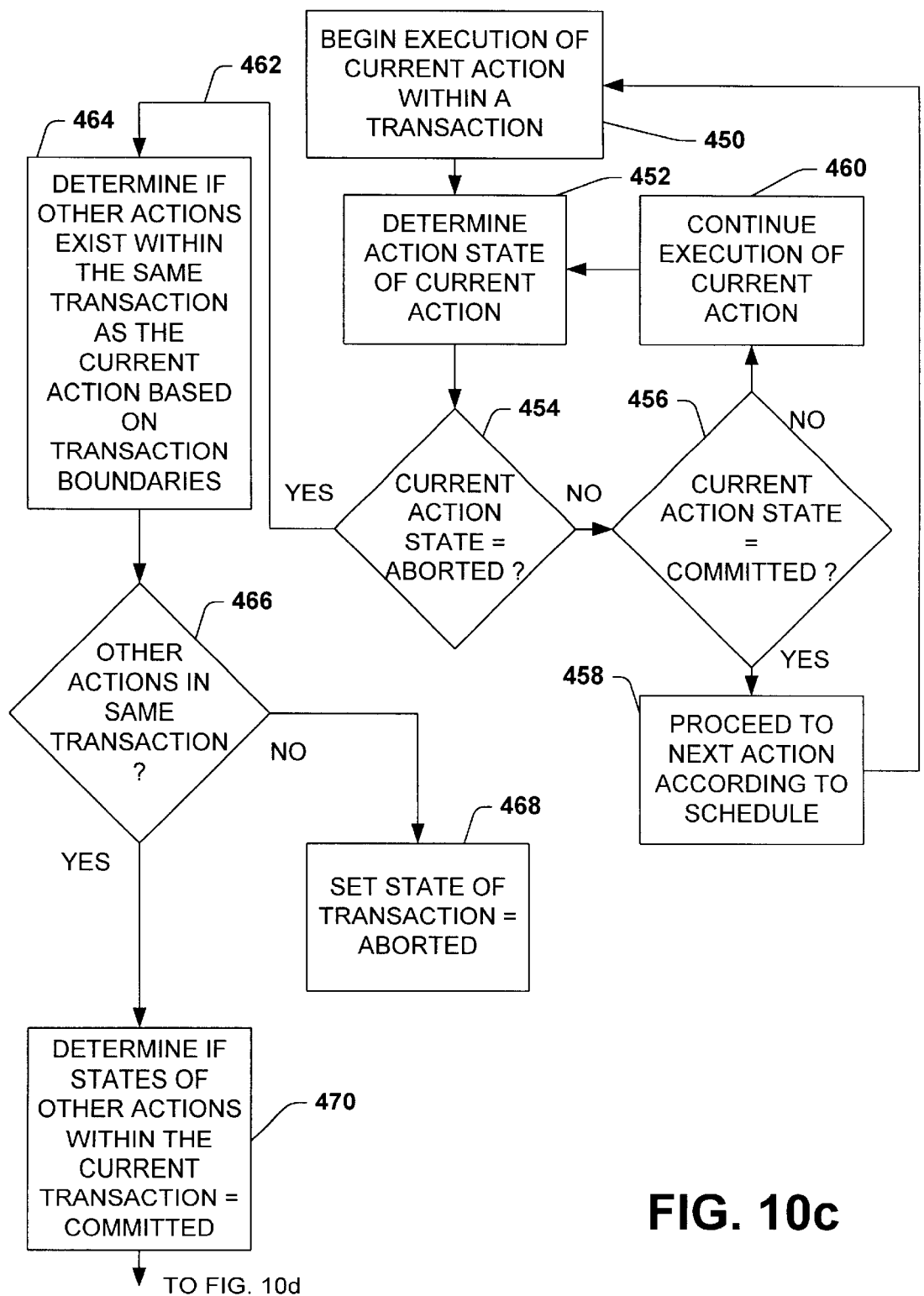
FIG. 10c is a flow chart illustrating a method for selectively compensating data in accordance with the invention.
Figure 10D:
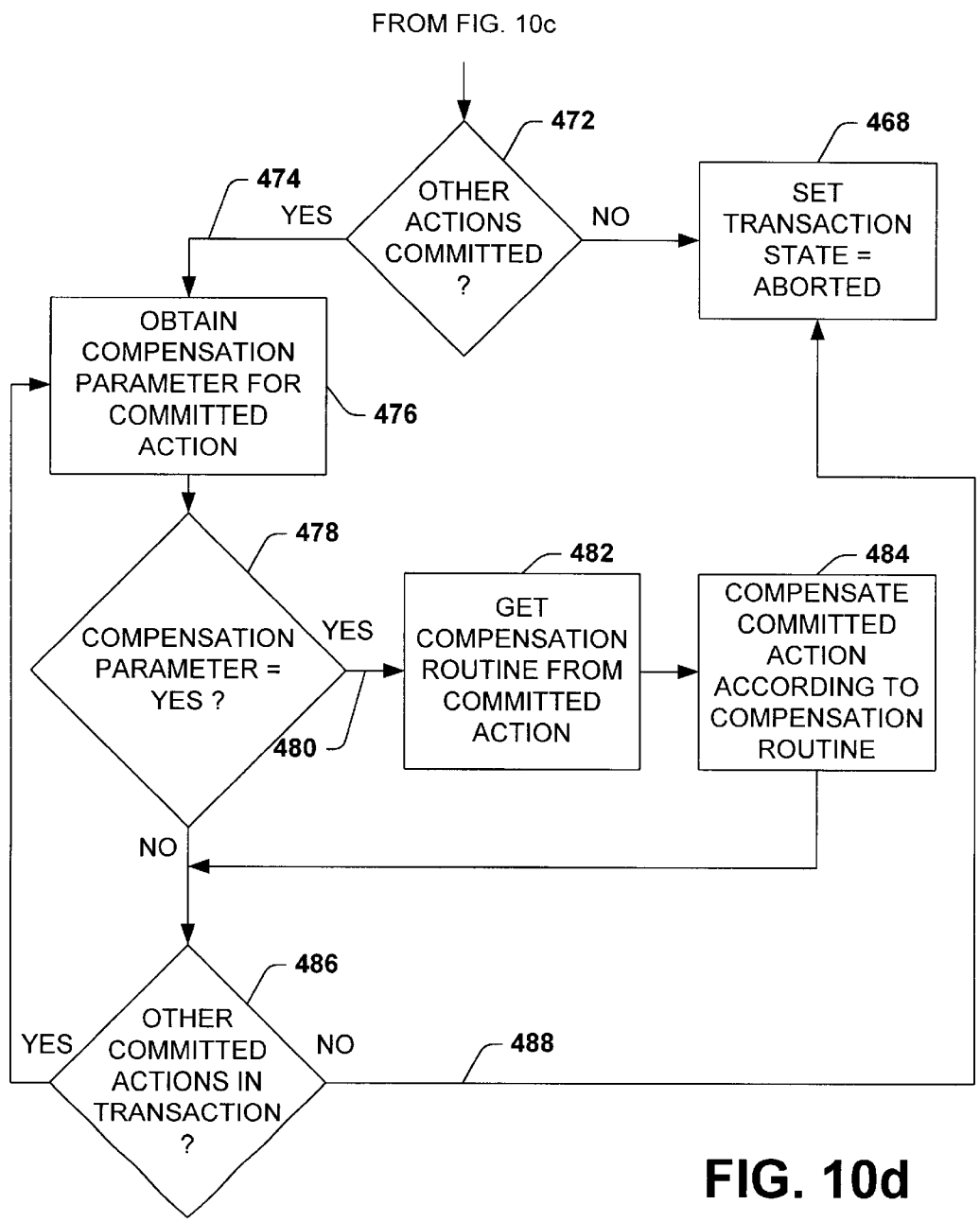
FIG. 10d is a flow chart illustrating a method for selectively compensating data in accordance with the invention.

FIGS. 10*c* and 10*d* illustrate a method for selectively compensating data such as the data 404*a*, based on commission of its associated action 404 (hence the commission of the sub-transaction 414), and subsequent abortion of the concurrent action 408. In this context, compensation may include sending messages, activating or instantiating objects or actions, rolling back the data by undoing the data manipulation performed by the committed actions, or combinations of these, or even doing nothing. Some examples of compensation might include broadcasting messages to notify other programs, objects, etc., that the suspect data may not be reliable, determining which objects, etc., have accessed the subject data after commission by the committed actions and notifying those objects that the data is suspect, or rolling back the data if it is determined that no other entities have accessed the data subsequent to commission by actions within the current transaction.

The compensation can be performed according to a compensation routine, a list of things to do, or a list of objects to activate or instantiate, etc. This selective compensation allows relaxation of isolation within hierarchical transaction boundaries, resulting in system efficiencies due to increased access to data. Accordingly, aggregate data locking in a given system will be of a shorter duration. Selective compensation further allows reduction in needless compensation where, for example, an action or a transaction does not modify data that will be accessed by other objects.

In FIG. 10*c*, execution of action C 408 begins at step 450, after which the state of the action 408 is checked at step 452. If the action state is not aborted, step 454 transfers execution to step 456, where the action state is tested for commission. If the action has committed, the next action is executed according to the schedule in step 458. Otherwise, execution of action 408 continues at step 460. This mode of execution through steps 452, 454, 456, and 460 continues until the action 408 either commits or aborts. If action 408 aborts, step 454 allows execution to proceed down path 462 to step 464, wherein it is determined whether other actions are within the same hierarchical compensated transaction as the current aborted action based on the hierarchical transaction boundaries within the schedule. If not, the hierarchical compensated transaction state is set to aborted at step 468. If, however, there are other actions in the same hierarchical compensated transaction, step 470 determines if any have committed.

Referring also to FIG. 10*d*, at step 472, if none of the other actions within the current transaction have committed, no compensation is performed, and the state of the transaction is set to aborted at step 468. In this situation, no compensation is needed because no other actions within the current transactions have modified their associated data. Alternatively, if at least one other action or hierarchical transaction within the current hierarchical transaction 400 has committed (and thus has potentially modified the data associated therewith), execution proceeds down path 474 to step 476, wherein the compensation parameter for the committed action is obtained. In the example of FIGS. 10*a* and 10*b*, it was assumed that actions 404 and 406 (and hence sub-transactions 414 and 416) had both committed prior to abortion of action 408. Accordingly, the compensation parameter A 428 associated with action 404 is tested in step 478, and found, in this example, to be "yes", and execution is thereby transferred along path 480 to step 482 where the compensation routine A 430 is obtained.

Thereafter, the data 404*a* associated with action 404 is compensated according to the compensation routine 430 in step 484, whereupon decision step 486 determines whether there are other committed actions within the hierarchical transaction 400 which require selective compensation. In this example, action 406 (and hence sub-transaction 416), has committed, and may need compensation based on its associated compensation parameter, and compensation routine (not shown). As such, execution proceeds from step 486 through steps 476, 478, 482, and 484 with respect to the committed action 406, which may or may not be compensated, depending on the compensation parameter and routine, after which step 486 transfers execution down path 488, whereupon step 468 sets the transaction state for the hierarchical compensated transaction 400 to aborted. The illustrated example tests a compensation parameter, which is either "yes" or "no" as determined by a user when defining a schedule. In this regard, alternative examples are possible within the present invention, wherein no compensation parameter is utilized. In such an example, an action for which no compensation is desired could include a compensation routine which was empty, or included only a NO-OP, etc.

The method illustrated in FIGS. 10*a*–10*d* thus provides a selective compensation method by which committed actions may be compensated based upon associated compensation parameters and routines. In this regard, hierarchical compensated transaction boundaries can further be used in the invention for selectively compensating a committed hierarchical compensated transaction. As shown in FIG. 4, the hierarchical transaction Tx1 includes hierarchical transactions Tx2 and Tx3 within its transaction boundary. Commission of the hierarchical transaction Tx1 depends on commission of the action 228, which in turn depends on commission of actions 220 and 224 as well as commission of transactions Tx2 and Tx3. Thus, according to the present invention, if the hierarchical compensated transactions Tx2 and Tx3 each commit, and the action 224 subsequently aborts, the hierarchical compensated transactions Tx2 and Tx3 can be compensated selectively according to transactional compensation parameters and routines associated therewith (not shown).

Storage of Schedule State Information Based on Transaction Boundaries

Referring now to FIGS. 2, 7, and 11a through 11c, a portion of memory 324 is shown, wherein schedule state information is stored according to the transaction boundaries within the exemplary schedule illustrated in FIG. 7. In accordance with the invention, the schedule state information is stored in a storage medium at the entrance and/or the exit of a transaction (i.e., crossing a transaction boundary). In addition, the schedule state information, as well as data associated therewith, may be stored according to a schema. This allows the schedule state to be easily monitored using database query tools and the like.

At any time, including after the schedule completes execution, the storage medium can be read, and the schedule state information therein can be used to determine the schedule status, the time particular transactions began or finished, which transactions, if any, have failed or aborted, and so on. In addition, the transaction boundaries can be defined by a user in order to provide fine-grained control over the information stored in the storage medium, and to provide for fine-grained access to data through the commit rule for hierarchical transactions as discussed supra.

Figure 11A:
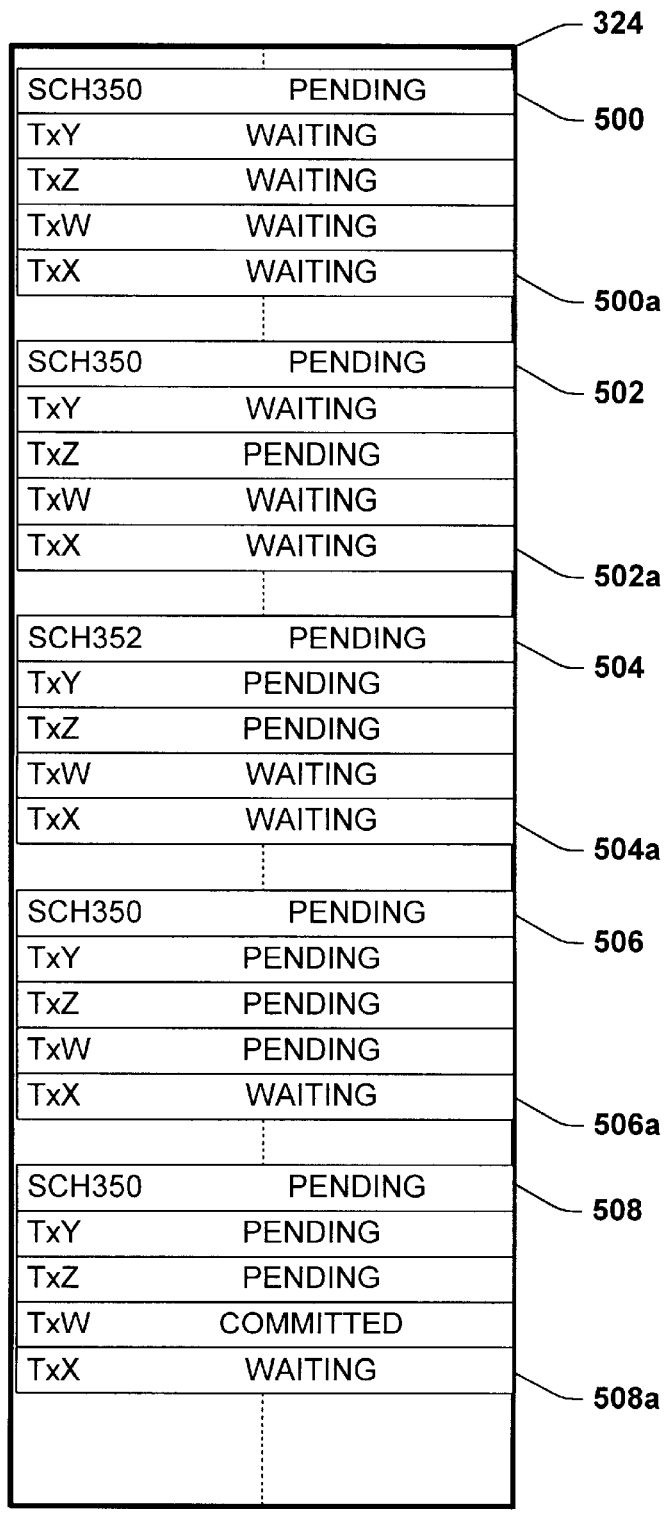
FIG. 11a is a block diagram illustrating a memory having schedule state information stored therein in accordance with the invention.
Figure 11B:
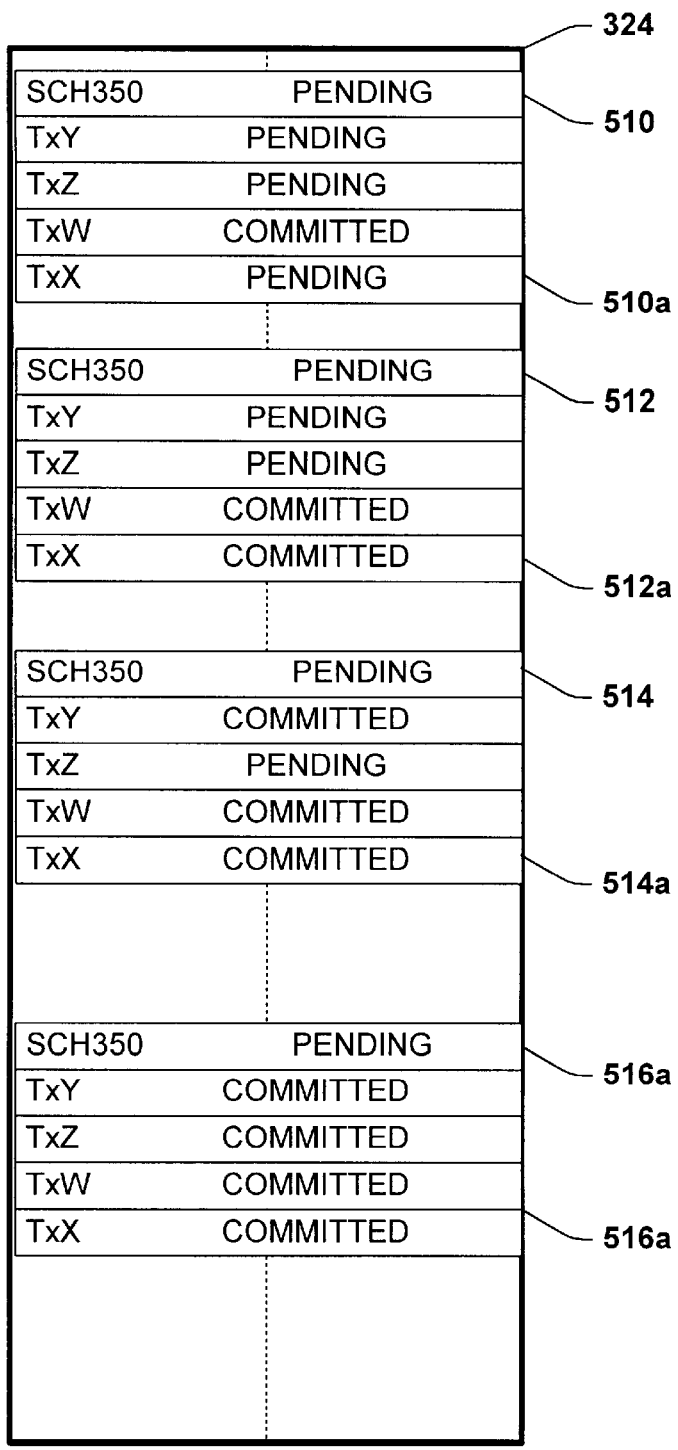
FIG. 11b is a block diagram illustrating a memory having schedule state information stored therein in accordance with the invention.

Referring also to FIG. 2, a method is now described, wherein schedule state information is stored in a storage medium, such as the non-volatile memory 324 of FIGS. 6 and 11a and 11b, based on the user-defined hierarchical transaction boundaries. When schedule 350 begins in block 354 (FIG. 7), schedule state information may be stored in memory 324. In this example, the schedule state information is illustrated to include the states (e.g., "waiting", "pending", "aborted", or "committed") of the various hierarchical transactions TxY, TxZ, TxW, and TxX within the schedule 350, as well as the state of the schedule 350 itself. At the instantiation of the schedule 350, it is assumed that the schedule state is stored to memory 324, beginning at memory location 500 and ending at memory location 500a. At this time, all hierarchical transactions TxY, TxZ, TxW, and TxX in the present example are "waiting", and the schedule 350 is "pending".

In accordance with the invention, the schedule state information may be stored in a storage medium at every transaction boundary crossing (e.g., each time a transaction is exited or entered), or alternatively only when a transaction is exited, or only when a transaction is entered. In this example, the schedule state information is stored both upon entering and upon exiting a transaction. It is additionally assumed in the illustrated example, that the schedule state information is stored in different locations within the memory 324 at each transaction boundary, so that no such state information is overwritten. It will be appreciated, however, that this method of storage is not required under the invention, and that alternatively, the information could be overwritten each time a transaction boundary is crossed, thus leaving only the latest schedule state information available in the memory 324. In this alternative, the state of a schedule instance could be monitored, for instance, using event monitoring techniques. The illustrated method, although requiring more memory space, allows subsequent historical analysis of the schedule execution.

Referring also to FIG. 2, assuming that hierarchical transaction TxZ next begins execution in step 52, the schedule state information is again stored at step 54 to the memory 324 in locations 502 through 502a as shown in FIG. 11a. Hierarchical transactions TxY and TxZ may operate concurrently, based on the transactional hierarchy of the example schedule of FIG. 7. However, it is assumed in the following discussion that the hierarchical transaction TxZ actually begins execution prior to transaction TxY. The state information at this point indicates that the schedule 350 is pending, and that hierarchical transaction TxZ is pending, with all the other transactions waiting.

The execution of hierarchical transaction TxZ will proceed through the steps 56, 58, and 64 of the method illustrated in FIG. 2, until all the actions E 362, F 364, and G 366 have successfully completed, at which time the schedule state information will again be stored to the storage medium 324 at step 66 of FIG. 2. In the following discussion, it will be understood that the method of FIG. 2 is used throughout to execute the hierarchical transactions and to store the schedule state information to the storage medium 324 upon entrance into and exit from each hierarchical transaction. In order to illustrate other aspects of the invention, the specific steps of FIG. 2 will not be reiterated for each hierarchical transaction within the exemplary schedule shown in FIG. 7.

Subsequently, the hierarchical transaction TxY begins execution, at which time the schedule state information is stored in locations 504 through 504a in memory 324 indicating that the schedule 352, and hierarchical transactions TxY and TxZ are pending. As hierarchical sub-transaction TxW within hierarchical transaction TxY begins, the schedule state information is again stored in the memory 324 at locations 506 through 506a. Assuming that the next transaction boundary crossing is at the commission of hierarchical transaction TxW, the schedule state information is stored to locations 508 through 508a of memory 324 indicating the committed status of transaction TxW, the pending status of schedule 350 and hierarchical transactions TxY and TxZ, with hierarchical transaction TxX still waiting.

Referring now to FIG. 11b, as execution of the schedule 350 proceeds, hierarchical transaction TxX begins execution, and the schedule state is again stored to the memory 324 at locations 510 through 510a, thus indicating hierarchical transaction TxX as pending, with the other states remaining the same. Assuming the next transaction boundary crossing is when hierarchical transaction TxX commits, the state information is stored at locations 512 through 512a in the memory 324. Any database query tool now accessing the memory 324 at these locations can thus determine that the hierarchical transactions TxW and TxX within the hierarchical transaction TxY have committed, with hierarchical transactions TxY and TxZ, and the schedule 350 still pending. Proceeding in this fashion, hierarchical transaction TxY next commits, with the schedule state information being accordingly stored in memory 324 at locations 514 through 514a, followed by the commission of hierarchical transaction TxZ. The state information for this latest transaction boundary crossing is stored at locations 516 through 516a.

Figure 11C:
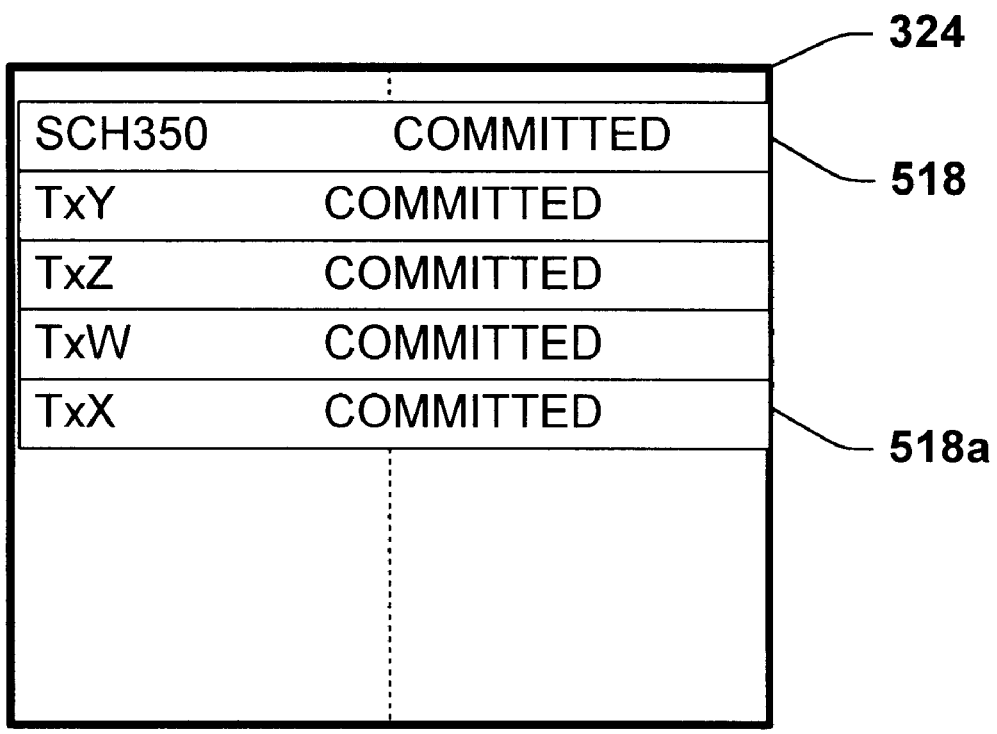
FIG. 11c is a block diagram illustrating a memory having schedule state information stored therein in accordance with the invention.

Finally, in FIG. 11c, the schedule 350 commits (the ultimate parent or "root" transaction 352 having committed), and the schedule state information, showing all hierarchical transactions committed, is stored to memory 324 at locations 518 through 518a. The memory 324 thus contains a historical record of the execution of one instance of the schedule 350, which can be consulted using database query tools or by other means, in order to determine the sequence of events associated with the schedule instance execution. In this regard, it will be appreciated that the schedule state information stored to memory 324 can include any number of parameters associated with the execution of the schedule, including, for example, the time at which the transactions are executed, and the like. Accordingly, the system user can determine, for instance, the time it takes to execute any or all the transactions within a schedule.

Furthermore, the schedule state information can be used for troubleshooting where, for example, a certain transaction within the schedule repeatedly aborts. The schedule information will thus enable diagnostic analysis of the schedule's operation, through historical or real-time monitoring techniques using query tools and the like.

Exemplary Operating Environment

Figure 12:
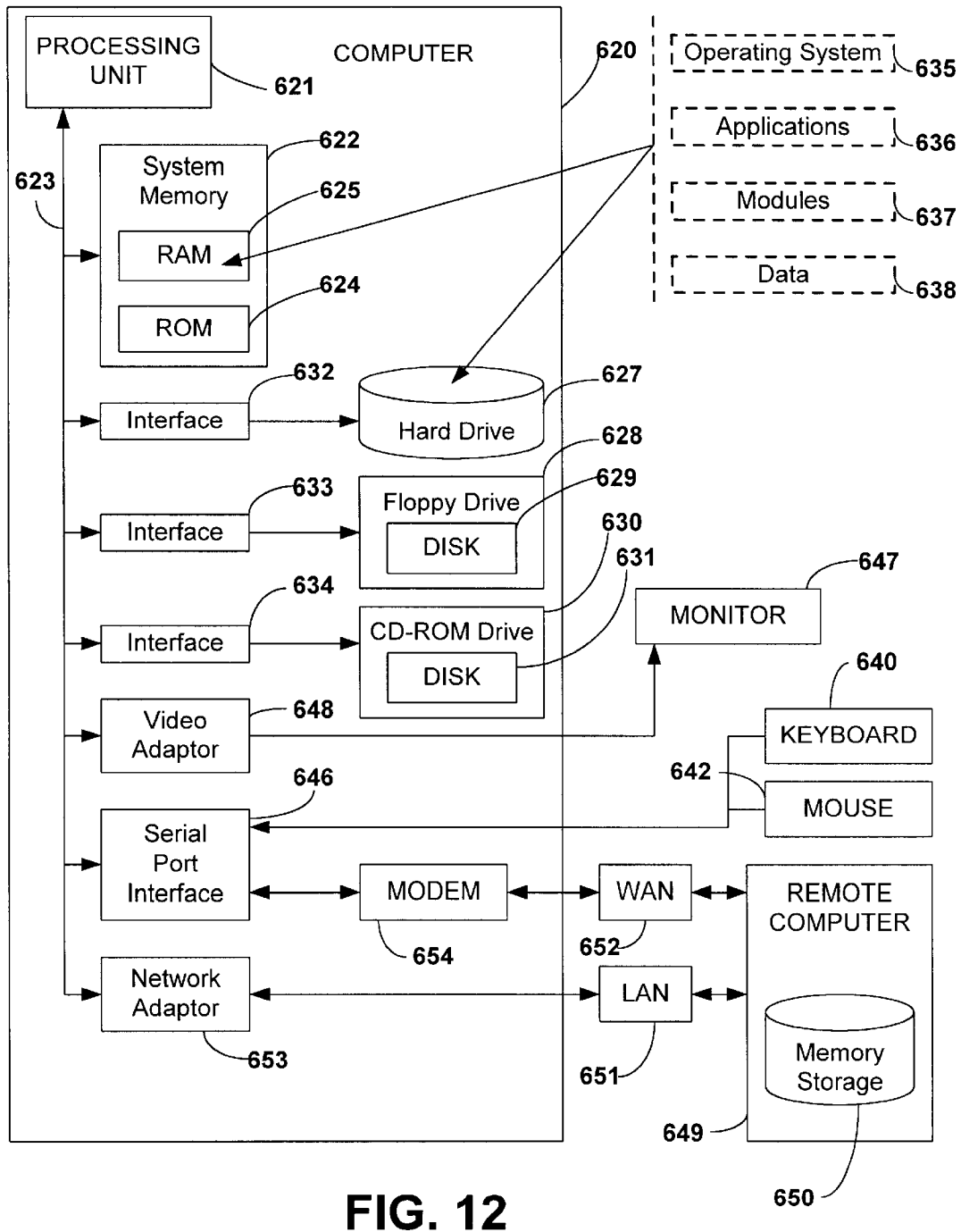
FIG. 12 is a block diagram illustrating an exemplary environment for the invention.

In order to provide a context for the various aspects of the invention, FIG. 12 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary system for implementing the various aspects of the invention includes a conventional server computer 620, including a processing unit 621, a system memory 622, and a system bus 623 that couples various system components including the system memory to the processing unit 621. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 621.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 624 and random access memory (RAM) 625. A basic input/output system (BIOS), containing the basic routines that help to transfer information between elements within the server computer 620, such as during start-up, is stored in ROM 624.

The server computer 620 further includes a hard disk drive 627, a magnetic disk drive 628, e.g., to read from or write to a removable disk 629, and an optical disk drive 630, e.g., for reading a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage of data, data structures, computer-executable instructions, etc. for the server computer 620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 625, including an operating system 635, one or more application programs 636, other program modules 637, and program data 638. The operating system 635 in the illustrated computer is the Microsoft Windows NT Server operating system, together with the before mentioned Microsoft Transaction Server.

A user may enter commands and information into the server computer 620 through a keyboard 640 and a pointing device, such as a mouse 642. Other input devices (not shown) may include a microphone, a joystick, a game pad, a satellite dish, a scanner, or the like. These and other input devices are often connected to the processing unit 621 through a serial port interface 646 that is coupled to the system bus, but may be connected by other interfaces, such as a parallel port, a game port or a universal serial bus (USB). A monitor 647 or other type of display device is also connected to the system bus 623 via an interface, such as a video adapter 648. In addition to the monitor, computers typically include other peripheral output devices (not shown), such as speakers and printers.

The server computer 620 may operate in a networked environment using logical connections to one or more remote computers, such as a remote client computer 649. The remote computer 649 may be a workstation, a server computer, a router, a peer device or other common network node, and typically includes many or all of the elements described relative to the server computer 620, although only a memory storage device 650 is illustrated in FIG. 12. The logical connections depicted in FIG. 12 include a local area network (LAN) 651 and a wide area network (WAN) 652. Such networking environments are commonplace in offices, enterprise-wide computer networks, intranets and the Internet.

When used in a LAN networking environment, the server computer 620 is connected to the local network 651 through a network interface or adapter 653. When used in a WAN networking environment, the server computer 620 typically includes a modem 654, or is connected to a communications server on the LAN, or has other means for establishing communications over the wide area network 652, such as the Internet. The modem 654, which may be internal or external, is connected to the system bus 623 via the serial port interface 646. In a networked environment, program modules depicted relative to the server computer 620, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 620, unless otherwise indicated. Such acts and operations are sometimes referred to as being computer-executed. It will be appreciated that the acts and symbolically represented operations include the manipulation by the processing unit 621 of electrical signals representing data bits which causes a resulting transformation or reduction of the electrical signal representation, and the maintenance of data bits at memory locations in the memory system (including the system memory 622, hard drive 627, floppy disks 629, and CD-ROM 631) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain embodiments, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a computer-readable medium having computer-executable instructions for performing the steps of the various methods of the invention. In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A method for executing a hierarchical transaction having a parent transaction and a sub-transaction, comprising:

executing an action associated with the sub-transaction; and committing the sub-transaction upon successful completion of the action associated therewith, thereby allowing access to data associated with the action according to a user redefinable transaction boundary associated with the sub-transaction.

2. The method of claim 1, wherein the sub-transaction has a transaction boundary associated therewith, further comprising committing the sub-transaction upon successful completion of all actions within the transaction boundary of the sub-transaction.

3. The method of claim 1, wherein the sub-transaction has a transaction boundary associated therewith, further comprising aborting the sub-transaction upon unsuccessful execution of an action within the transaction boundary associated with the sub-transaction.

4. The method of claim 1, further comprising storing state information associated with the action in a storage medium upon recognizing a transaction boundary.

5. The method of claim 1, further comprising selectively compensating the action after abortion of another action associated therewith.

6. The method of claim 5, further comprising selectively obtaining at least a portion of the state information from the storage medium.

7. The method of claim 6, further comprising selectively monitoring a status of the action based on at least a portion of the state information obtained from the storage medium.

8. The method of claim 6, further comprising selectively monitoring the state of the sub-transaction in the hierarchical transaction based on at least a portion of the state information obtained from the storage medium.

9. The method of claim 1, further comprising providing a facility for retrying failed actions according to at least one parameter before aborting a sub-transaction.

10. A method of executing a schedule with hierarchical transactions having a parent transaction and at least one sub-transaction within the parent transaction, comprising:

initiating an action within the sub-transaction;

executing the action; and committing the sub-transaction upon completion of the action as per a user redefinable transaction boundary, whereby data associated with the action is unlocked.

11. The method of claim 10, further comprising selectively compensating an action according to a transaction boundary associated with the sub-transaction after abortion of another action.

12. The method of claim 10, further comprising employing the unlocked data to monitor a status of an action within the sub-transaction.

13. The method of claim 12, wherein employing the unlocked data comprises storing state information in a storage medium based on a transaction boundary associated with a sub-transaction.

14. A computer-readable medium having computer-executable instructions for executing a hierarchical transaction having a parent transaction and a sub-transaction, the computer-readable medium having computer-executable instructions for:

executing an action associated with the sub-transaction; and committing the sub-transaction upon successful completion of the action associated therewith, thereby allowing access to data associated with the action according to a user redefinable transaction boundary associated with the sub-transaction.

15. The computer-readable medium of claim 14, wherein the sub-transaction has a transaction boundary associated therewith, having further computer-executable instructions for committing the sub-transaction upon successful completion of all actions within the transaction boundary of the sub-transaction.

16. The computer-readable medium of claim 14, wherein the sub-transaction has a transaction boundary associated therewith, having further computer-executable instructions for aborting the sub-transaction upon unsuccessful execution of an action within the transaction boundary associated with the sub-transaction.

17. The computer-readable medium of claim 16, having further computer-executable instructions for storing state information associated with the action in a storage medium upon recognizing a transaction boundary.

18. The computer-readable medium of claim 17, having further computer-executable instructions for selectively obtaining at least a portion of the state information from the storage medium.

19. The computer-readable medium of claim 18 having further computer-executable instructions for selectively monitoring a status of the action based on at least a portion of the state information obtained from the storage medium.

20. The computer-readable medium of claim 18, having further computer-executable instructions for selectively monitoring the state of the sub-transaction in the hierarchical transaction based on at least a portion of the state information obtained from the storage medium.

21. The computer-readable medium of claim 14, having further computer-executable instructions for selectively compensating the action after abortion of another action associated therewith.

22. A system for executing a hierarchical transaction having a parent transaction and a sub-transaction, comprising:

means for executing an action associated with the sub-transaction; and means for committing the sub-transaction upon successful completion of the action associated therewith, thereby allowing access to data associated with the action according to a user redefinable transaction boundary associated with the sub-transaction.

23. The system of claim 22, wherein the sub-transaction has a transaction boundary associated therewith, further comprising means for committing the sub-transaction upon successful completion of all actions within the transaction boundary of the sub-transaction.

24. A method of monitoring a schedule having a parent transaction, a sub-transaction, and state information associated therewith, comprising:

executing the sub-transaction according to the schedule; and allowing access to at least a portion of the state information associated with the sub-transaction prior to completion of the parent transaction as per a user redefinable transaction boundary, thereby permitting use of the state information for event monitoring or history reporting.

25. The method of claim 24, wherein allowing access to the state information comprises storing state information in a storage medium when a transaction boundary associated with the sub-transaction is recognized, and monitoring the state information in the storage medium.

26. The method of claim 25, wherein monitoring the state information comprises history reporting.

27. The method of claim 24, wherein allowing access to the state information comprises monitoring the state information when a transaction boundary associated with the sub-transaction is recognized.

28. The method of claim 27, wherein monitoring the state information includes event monitoring.

29. A system for monitoring a schedule having state information, a root transaction, and a sub-transaction associated therewith, comprising:

means for executing the root transaction and the sub-transaction according to the schedule;

means for allowing access to at least a portion of the state information associated with the sub-transaction prior to completion of the parent transaction as per a user redefinable transaction boundary.

30. The system of claim 29, wherein the means for allowing access comprises means for storing the state information in a storage medium when a transaction boundary associated with the sub-transaction is recognized, and means for obtaining the state information from the storage medium.

31. The system of claim 30, wherein the means for obtaining the state information from the storage medium comprises means for history reporting.

32. The system of claim 29, further including a means for monitoring the state information.

* * * * *